(12) United States Patent
Jeong

(10) Patent No.: US 12,032,854 B2
(45) Date of Patent: Jul. 9, 2024

(54) MEMORY SYSTEM AND OPERATING METHOD THEREOF

(71) Applicant: SK hynix Inc., Icheon-si (KR)

(72) Inventor: Beom Rae Jeong, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/590,538

(22) Filed: Feb. 1, 2022

(65) Prior Publication Data

US 2023/0033610 A1 Feb. 2, 2023

(30) Foreign Application Priority Data

Jul. 30, 2021 (KR) .................. 10-2021-0100795

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/061* (2013.01); *G06F 3/0631* (2013.01); *G06F 3/0656* (2013.01); *G06F 3/0673* (2013.01); *G06F 3/0679* (2013.01)

(58) Field of Classification Search
CPC ...... G06F 3/061; G06F 3/0631; G06F 3/0656; B06F 3/0679
See application file for complete search history.

(56) References Cited

U.S. PATENT DOCUMENTS

| | | | |
|---|---|---|---|
| 2006/0218346 A1* | 9/2006 | Nagumo | G06F 11/1466 711/114 |
| 2011/0271041 A1* | 11/2011 | Lee | G06F 12/0868 711/E12.008 |
| 2014/0068156 A1* | 3/2014 | Lee | G06F 12/0866 711/113 |
| 2019/0286555 A1* | 9/2019 | Park | G06F 3/061 |
| 2019/0392907 A1* | 12/2019 | Her | G06F 12/0246 |
| 2020/0241956 A1* | 7/2020 | Son | G06F 3/065 |
| 2022/0188234 A1* | 6/2022 | Na | G06F 12/0253 |

FOREIGN PATENT DOCUMENTS

| | | |
|---|---|---|
| KR | 101179027 B1 | 8/2012 |
| KR | 20150017599 A | 2/2015 |

* cited by examiner

*Primary Examiner* — John A Lane
(74) *Attorney, Agent, or Firm* — Perkins Coie LLP

(57) ABSTRACT

Systems and methods that relate to memory devices are disclosed. In some implementations, a memory system includes a first data storage device and a second data storage device. Each of the first and second data storage devices includes a plurality of memory blocks, each memory block including a plurality of memory cells each operable to store one or more data bits, and page buffers that cache data to be written to the memory blocks or read from the plurality of memory blocks on a page basis, and a controller including a cache memory configured to temporarily store first data, and configured to move the first data from a portion of the cache memory to one or more of the page buffers of the first data storage device and allocate the portion of the cache memory as a temporary buffer for storing data.

18 Claims, 21 Drawing Sheets

MEMORY SYSTEM AND OPERATING METHOD THEREOF

CROSS-REFERENCE TO RELATED APPLICATION(S)

This patent application claims the priority and benefits of Korean Patent Application No. 10-2021-0100795, filed on Jul. 30, 2021, the disclosed technology of which is incorporated herein by reference in its entirety.

TECHNICAL FIELD

Various embodiments of the disclosed technology generally relate to a memory system and an operating method thereof, and more particularly to a memory system that can efficiently perform a garbage collection operation by using a page buffer of a memory device, and an operating method of the memory system.

BACKGROUND

The computing environment paradigm is transitioning to ubiquitous computing, enabling computing to take place anytime and anywhere. The recent increase in the use of ubiquitous computing is leading to an increase in the use of portable electronic devices such as mobile phones, digital cameras, and notebook computers. These portable electronic devices generally use a memory system having one or more memory devices for storing data.

A memory system may be used as a main data storage device or an auxiliary data storage device of the portable electronic devices.

Semiconductor-based data storage devices provide advantages over the traditional hard disk drives since semiconductor memory devices have no mechanical components such as a mechanical arm, and thus offers excellent stability and durability, high data access rate and low power consumption. Examples of the semiconductor-based data storage devices include a USB (Universal Serial Bus) memory device, a memory card having various interfaces, a solid state drive (SSD) or others.

SUMMARY

In an embodiment of the disclosed technology, a memory system includes a first data storage device and a second data storage device. Each of the first and second data storage devices includes: a plurality of memory blocks, each memory block including a plurality of memory cells each operable to store one or more data bits; and page buffers that cache data to be written to the memory blocks or read from the plurality of memory blocks on a page basis, and a controller including a cache memory configured to temporarily store first data, and configured to move the first data from a portion of the cache memory to one or more of the page buffers of the first data storage device and allocate the portion of the cache memory as a temporary buffer for storing data.

In another embodiment of the disclosed technology, an operating method of a memory system having a controller for controlling one or more data storage devices that store data includes: storing first data in a cache memory of the controller; transferring the first data to one or more of page buffers in a first data storage device from a portion of the cache memory; and allocating the portion of the cache memory as a temporary buffer for storing data.

In another embodiment of the disclosed technology, a memory system may comprise a first data storage and a second data storage each including a plurality of pages each including multi-level cells corresponding to a plurality of bits, a plurality of blocks each including the pages, and buffer memory devices that cache data inputted to the blocks or outputted from the blocks in units of pages and correspond to the plurality of bits; and a controller including a cache memory that temporarily may store first data, and configured to move the first data to some of the buffer memory devices of the first data storage for securing an empty area in the cache memory and allocating the empty area as a temporary buffer for storing data.

In another embodiment of the disclosed technology, an operating method of a memory system, may comprise storing first data in a cache memory of a controller; moving the first data to some of buffer memory devices of a first data storage for securing an empty area in the cache memory; and allocating the empty area as a temporary buffer for storing data.

DETAILED DESCRIPTION

Figure 1:
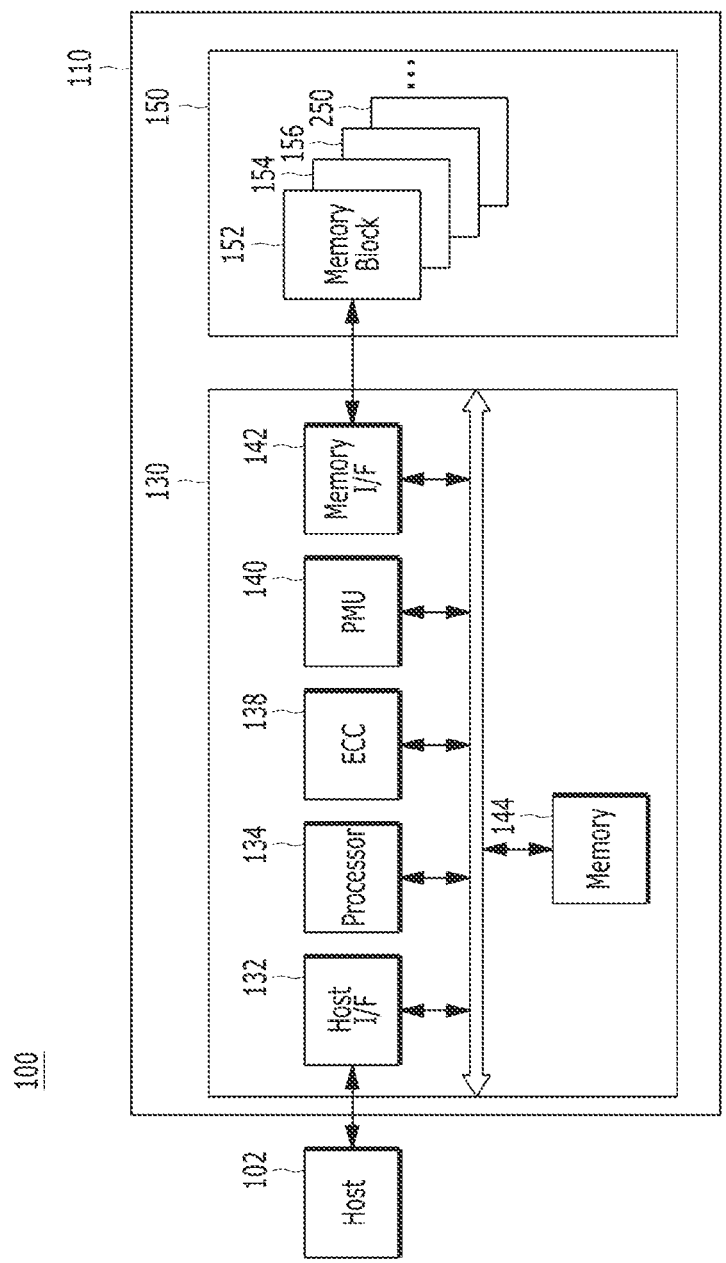
FIG. 1 is a block diagram illustrating an example of a data processing system including a memory system based on some embodiments of the disclosed technology.

Various examples of the disclosure are described below in more detail with reference to the accompanying drawings. The disclosure may be embodied in other embodiments, forms and variations thereof and should not be construed as being limited to the embodiments set forth herein. Rather, the described embodiments are provided so that this disclosure is thorough and complete, and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element that otherwise have the same or similar names. Thus, a first element in one instance may be referred to as a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or made clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the disclosure pertains in view of the present disclosure. It will be further understood that terms, such as those defined in commonly used dictionaries, should be interpreted as having a meaning that is consistent with their meaning in the context of the disclosure and the relevant art, and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosed technology will be described in detail with reference to the accompanied drawings.

FIG. 1 illustrates an example of a data processing system 100.

In some implementations, the data processing system 100 may include a host 102 engaged, interlocked or in communication with a memory system 110.

The host 102 may include a portable electronic device (e.g., mobile phone, MP3 player, laptop computer, etc.) or an electronic device such as a desktop computer, a game player, a television (TV), a projector and others.

The host 102 may also include at least one operating system (OS) to manage and control functions and operations of the host 102. For example, the OS can provide interoperability between the host 102 engaged with the memory system 110 and a user of the memory system 110. The OS may support functions and operations corresponding to user requests.

By the way of example but not limitation, the OS can be a general operating system or a mobile operating system, for example, according to mobility of the host 102. The general operating system may be, for example, a personal operating system or an enterprise operating system according to system requirements or a user environment. The personal operating system (e.g., Windows, Chrome, etc.) may be subject to support services for various purposes. The enterprise operating systems can be specialized for securing and supporting high performance, including Windows servers, Linux, Unix and others.

The mobile operating system may be based on, for example, Android, iOS, Windows mobile, or another system. The mobile operating system may be subject to support services or functions for mobility (e.g., a power saving function). In one embodiment, the host 102 may include a plurality of operating systems, and may execute multiple operating systems interlocked with the memory system 110 based on a user request. The host 102 may transmit a plurality of commands corresponding to the user requests to the memory system 110, to thereby perform operations corresponding to commands within the memory system 110.

The memory system 110 may operate or perform a specific function or operation in response to a request from the host 102, e.g., may store data to be accessed by the host 102. The memory system 110 may be used as a main memory system or an auxiliary memory system of the host 102. The memory system 110 may be implemented with one of various types of storage devices electrically coupled with the host 102 and may communicate therewith according to a protocol of a host interface. Non-limiting examples of the storage device include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and others.

The storage devices for the memory system 110 may be implemented with a volatile memory device (e.g., dynamic random access memory (DRAM) and static RAM (SRAM)) and/or a nonvolatile memory device (e.g., read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magnetoresistive RAM (MRAM), resistive RAM (RRAM or ReRAM), flash memory, etc.).

The memory system 110 may include a controller 130 and a memory device 150. The memory device 150 may store data to be accessed by the host 102. The controller 130 may control storage of data in the memory device 150.

The controller 130 and memory device 150 may be integrated into a single semiconductor device, which, for example, may be in any of the types of memory systems as exemplified above. By the way of example but not limitation, the controller 130 and the memory device 150 may be integrated into a single semiconductor device. The controller 130 and memory device 150 may be integrated into an SSD for improving operation speed. When the memory system 110 is used as an SSD, the operating speed of the host 102 connected to the memory system 110 can be improved more than that of the host 102 implemented with a hard disk.

In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory or others.

The memory system 110 may be configured as part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain the storage of data therein even when electrical power is not supplied. The memory device 150 may store data provided from the host 102 through a write operation and may provide data stored therein to the host 102 through a read operation. The memory device 150 may include a plurality of memory blocks 152, 154, 156, each of which may include a plurality of pages. Each of the pages may include a plurality of memory cells to which word lines (WL) are electrically coupled. The memory device 150 also includes a plurality of memory dies, each of which includes a plurality of planes and each of the planes including a plurality of memory blocks 152, 154, 156. The memory device 150 may be a non-volatile memory device. Examples include a flash memory having a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102. The controller 130 may store the data, provided by the host 102, to the memory device 150.

The controller 130 may include a host interface (I/F) 132, a processor 134, an ECC unit 138, a power management unit (PMU) 140, a memory interface (I/F) 142 and a memory 144, all operatively coupled via an internal bus.

The host interface 132 may process commands and data from the host 102 and may communicate with the host 102 through at least one of various interface protocols. Examples include universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In an embodiment, the host interface 132 may exchange data with host 102 based on instructions, e.g., firmware, such as a host interface layer (HIL).

The ECC unit 138 may correct one or more error bits of data processed in the memory device 150 and which may include an ECC encoder and an ECC decoder. The ECC encoder can perform error correction encoding of data to be programmed in the memory device 150, in order to generate encoded data into which one or more parity bits are added. The encoded data may be stored by the ECC encoder in memory device 150. The ECC decoder can detect and correct errors in data read from the memory device 150 when the controller 130 reads data stored in the memory device 150. For example, after performing error correction decoding on the data read from the memory device 150, the ECC component 138 can determine whether the error correction decoding has succeeded and output an instruction signal (e.g., a correction success signal or a correction fail signal).

The ECC component 138 can use the parity bit, generated during the ECC encoding process, to correct the error bit(s) of the read data. When the number of error bits is greater than or equal to a threshold number of correctable error bits, the ECC component 138 might not correct error bits but instead may output an error correction fail signal indicating failure in correcting the error bits.

The ECC component 138 may perform an error correction operation in various ways, including but not limited to coded modulation. Examples include a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and a Block coded modulation (BCM), as well as others. The ECC component 138 may also include various circuits, modules, systems or devices for performing error correction operation based on at least one of the codes.

The PMU 140 may manage electrical power of the controller 130.

The memory interface 142 may serve as an interface for handling commands and data transferred between the controller 130 and the memory device 150, in order to allow the controller 130 to control the memory device 150 in response to a request from the host 102. The memory interface 142 may generate a control signal for the memory device 150 and may process data entered into or outputted from the memory device 150 under the control of the processor 134 when the memory device 150 is a flash memory, including but not limited to a NAND flash memory. The memory interface 142 can serve an interface for handling commands and data between the controller 130 and the memory device 150. For example, the memory interface 142 may serve as a NAND flash interface for purposes of handling operations between the controller 130 and the memory device 150. In an embodiment, the memory interface 142 can be implemented through firmware (e.g., Flash Interface Layer (FIL)), which serves as a component to exchange data with memory device 150.

The memory 144 may support operations performed by the memory system 110 and the controller 130. The memory 144 may store temporary or transactional data relating to or delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory, e.g., a static random access memory (SRAM), a dynamic random access memory (DRAM), or both. The second memory 144 may be disposed within the controller 130. In one embodiment, the memory 144 may be external and coupled to the controller 130. For instance, the memory 144 may include an external volatile memory having a memory interface that transfers data and/or signals between the memory 144 and the controller 130.

The memory 144 can store data for performing operations such as data writing and data reading requested by the host 102, and/or data transfer between the memory device 150 and the controller 130 for background operations such as garbage collection and wear levelling. In an embodiment, to support operations in the memory system 110, the memory 144 may include one or more of a program memory, a data memory, a write buffer/cache, a read buffer/cache, a data buffer/cache, a map buffer/cache, or others.

The processor 134 may be implemented, for example, with a microprocessor or a central processing unit (CPU). In one embodiment, the memory system 110 may include one or more processors 134. The processor 134 may control overall operation of the memory system 110. By way of example but not limitation, the processor 134 can control a program operation or a read operation of the memory device 150, in response to a write request or a read request entered from the host 102. In an embodiment, the processor 134 may use or execute instructions (e.g., firmware) to control overall operation of the memory system 110. In one embodiment, firmware may refer to a flash translation layer (FTL). The FTL may operate as an interface between the host 102 and the memory device 150. The host 102 may transmit requests for write and read operations to the memory device 150 through the FTL.

For example, the controller 130 may use the processor 134 (e.g., implemented as a microprocessor or central processing unit (CPU)) to perform operations requested from the host 102 in the memory device 150. The processor 134 may engage with the memory device 150 to handle instructions or commands corresponding to commands from the host 102. For example, the controller 130 can perform a foreground operation as an operation corresponding to a command from the host 102. Examples of the command include a program operation corresponding to a write command, a read operation corresponding to a read command, an erase/discard operation corresponding to an erase/discard command, and a parameter set operation corresponding to a set parameter command or a set feature command with a set command.

In one embodiment, the controller 130 may perform a background operation on the memory device 150 through the processor 134. By way of example but not limitation, the background operation for the memory device 150 includes an operation of copying and storing data stored in a memory block (among memory blocks 152, 154, 156 in the memory device 150) to another memory block, e.g., a garbage collection (GC) operation. The background operation can include an operation of moving or swapping data stored in at least one of the memory blocks 152, 154, 156 to at least another one of the memory blocks 152, 154, 156, e.g., a wear leveling (WL) operation.

During a background operation, the controller 130 may use the processor 134 to store the map data (stored in the controller 130) to at least one of the memory blocks 152, 154, 156 in the memory device 150, e.g., a map flush operation. A bad block management operation of checking or searching for bad blocks among the memory blocks 152, 154, 156 is another example of a background operation that may be performed by the processor 134.

In memory system 110, controller 130 may perform a plurality of operations corresponding to commands entered from the host 102. For example, when performing program operations corresponding to program commands, read operations corresponding to read commands and erase operations corresponding to erase commands sequentially, randomly or alternatively, the controller 130 can determine or select channel(s) or way(s) to perform each operation. The channel(s) or way(s) may be ones that connect, for example, the controller 130 to a plurality of memory dies in the memory 150.

The controller 130 can send or transmit data or instructions, via the channels or ways, for performing each operation. The memory dies in the memory 150 can transmit operation results, via the same channels or ways, after respective operations are completed. Then, the controller 130 may transmit a response or an acknowledge signal to the host 102. In an embodiment, the controller 130 can check a status of each channel or each way. In response to a command from the host 102, the controller 130 may select at least one channel or way based on the status of each channel or way, so that instructions and/or operation results with data may be delivered via the selected channel(s) or way(s).

By the way of example but not limitation, the controller 130 can recognize statuses regarding channels (or ways) associated with memory dies in the memory device 150. For example, the controller 130 may determine the state of each channel or each way as a busy state, a ready state, an active state, an idle state, a normal state or an abnormal state, or various combinations thereof. The determination of which channel or way an instruction (and/or a data) is delivered through by the controller can be associated with a physical block address, e.g., to which die(s) the instruction (and/or the data) is delivered.

Figure 2:
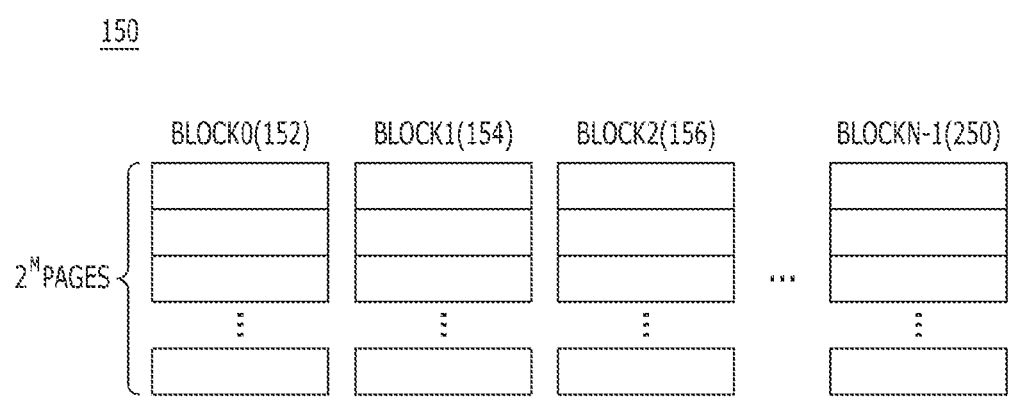
FIG. 2 is a diagram illustrating an example of a memory device based on some embodiments of the disclosed technology.
Figure 3:
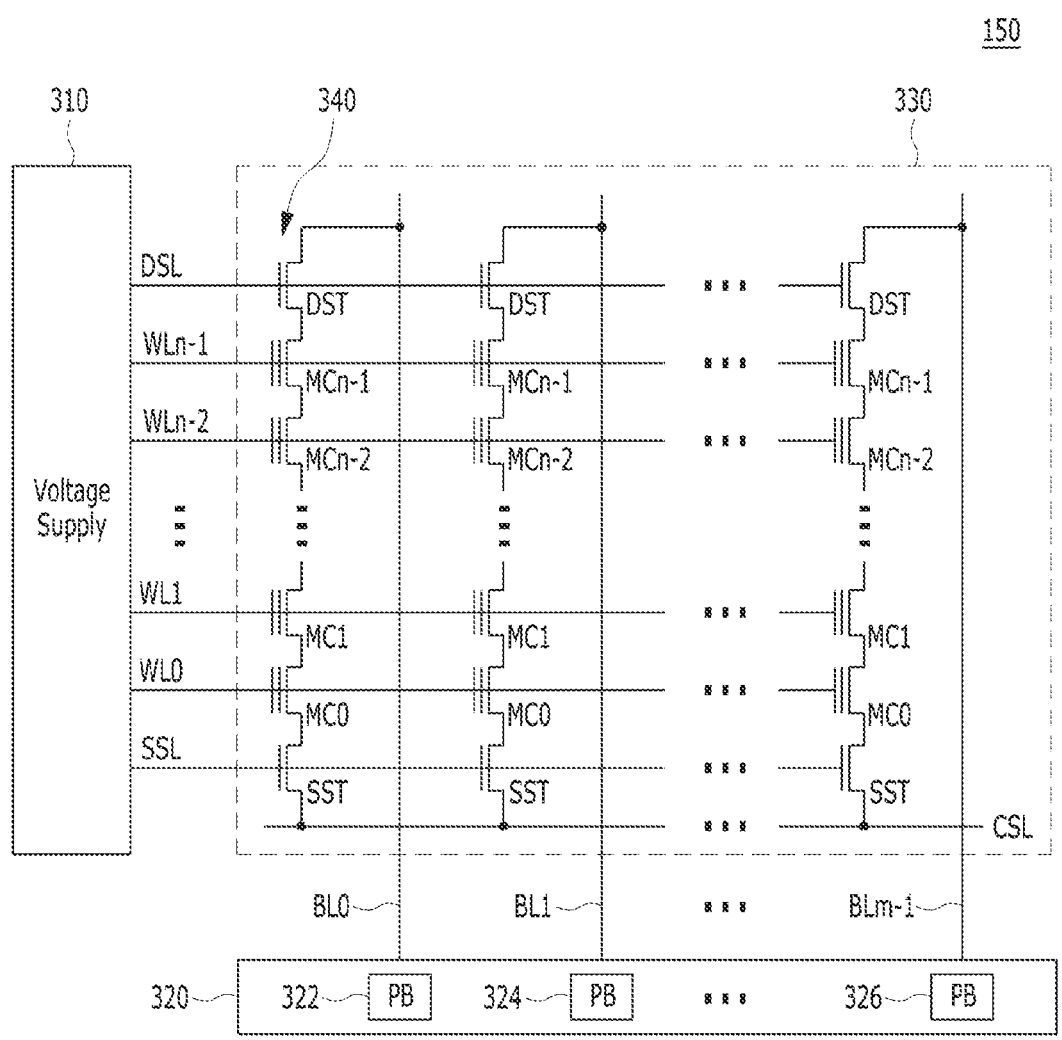
FIG. 3 is a diagram illustrating an example of a memory cell array of a memory block in the memory device based on some embodiments of the disclosed technology.
Figure 4:
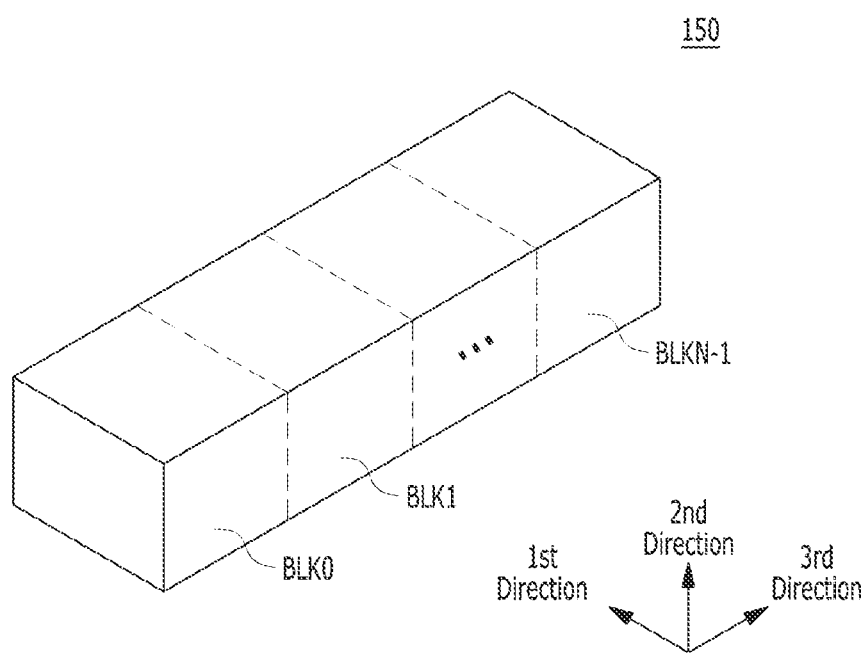
FIG. 4 is a diagram showing an example three-dimensional structure of the memory device based on some embodiments of the disclosed technology.

FIG. 2 is a schematic diagram illustrating an example of a memory device, e.g., memory device 150. FIG. 3 is a diagram illustrating an example of a memory cell array of a memory block 330 in memory device 150. FIG. 4 is a schematic diagram illustrating an embodiment of a 3D structure of memory device 150.

Referring to FIG. 2, the memory device 150 may include a plurality of memory blocks BLOCK0 (210) to BLOCKN−1 (240), where N is an integer greater than 1. Each of the blocks BLOCK0 to BLOCKN−1 may include a plurality of pages (e.g., $2^M$ or M pages), the number of which may vary according to circuit design, and where M is an integer greater than 1. Each of the pages may include a plurality of memory cells coupled to a plurality of word lines WL.

Also, memory cells in the respective memory blocks BLOCK0 to BLOCKN−1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages each of which includes memory cells, each storing one-bit data. The SLC memory blocks may generally have higher data computing performance and higher durability than MLC memory blocks.

The MLC memory blocks may include a plurality of pages, each of which includes memory cells, each storing multi-bit data (for example, 2 or more bits). The MLC memory blocks may generally have larger data storage space (e.g., higher integration density) than the SLC memory blocks. In one embodiment, the memory device 150 may include a plurality of triple level cell (TLC) memory blocks. In one embodiment, the memory device 150 may include a plurality of quadruple level cell (QLC) memory blocks. The memory device 150 may include a plurality of quadruple level cell (QLC) memory blocks. The TLC memory blocks may include a plurality of pages including memory cells, each capable of storing 3-bit data. The QLC memory blocks may include a plurality of pages including memory cells, each capable of storing 4-bit data. In one embodiment, the memory device 150 can be implemented with a block including a plurality of pages implemented by memory cells, each capable of storing 5-bit or more bit data The memory device 150 may store a larger amount of data in an MLC memory block than the SLC memory block. However, when the SLC memory block is used, the memory device 150 may process data faster than when the MLC memory block is used. For example, an SLC memory block and an MLC memory block may have different advantages and disadvantages. Therefore, when data is to be rapidly processed, the processor 134 may control the memory device 150 to write or program data to the SLC memory block. When a large data storage space is needed, the processor 134 may control the memory device 150 to write or program data to the MLC memory block. As a result, the processor 134 may decide the type of a memory block in which data are to be stored, depending on situations.

Instead of a nonvolatile memory, the memory device 150 may be implemented, for example, by any one of a phase change random access memory (PCRAM), a resistive random access memory (RRAM(ReRAM)), a ferroelectrics random access memory (FRAM), and a spin transfer torque magnetic random access memory (STT-RAM(STT-M RAM)).

The memory blocks 210, 220, 230, 240 may store the data transferred from the host 102 through a program operation, and may transfer data stored therein to the host 102 through a read operation.

Referring to FIG. 3, the memory blocks in the memory device 150 of the memory system 110 may include a plurality of cell strings 340, which are implemented as a memory cell array 330 coupled to bit lines BL0 to BLm−1, respectively. The cell string 340 of each column may include one or more drain select transistors DST and one or more source select transistors SST. A plurality of memory cells MC0 to MCn−1 may be coupled in series between the drain and source select transistors DST and SST. In an embodiment, each of the memory cell transistors MC0 to MCn−1 may be an MLC that can store data or information of a plurality of bits. Each of the cell strings 340 may be electrically coupled to a corresponding bit line among the plurality of bit lines BL0 to BLm−1.

In some embodiments of FIG. 3, memory cell array 330 includes NAND flash memory cells. However, the memory blocks in memory device 150 may be implemented as a NOR-type flash memory, a hybrid flash memory (in which two or more types of memory cells are mixed), a one-NAND flash memory (having a controller embedded in a memory chip), or another type of memory.

The voltage supply circuit 310 of the memory device 150 may provide word line voltages (e.g., program voltage, read voltage, pass voltage) to respective word lines, and a voltage to be supplied to a bulk region of a substrate (e.g., a well region) in which memory cells are formed, depending on operation modes. Here, a voltage generation operation of the voltage supply circuit 310 may be performed under control of a control circuit. Furthermore, the voltage supply circuit 310 may generate a plurality of variable read voltages in order to generate a plurality of read data, to select one of the memory blocks (or sectors) of the memory cell array, and to select one of the word lines of the selected memory block in response to control of the control circuit and provide word line voltages to the selected word line and the unselected word lines, respectively.

The memory device 150 may include a read/write circuit 320, which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for applying a voltage or a current to bit lines according to data to be stored in the memory cell array. During a program operation, the read/write circuit 320 may receive from a buffer data to be stored to the memory cell array and activate or drive bit lines according to the received data. The read/write circuit 320 may include a plurality of page buffers 322 to 326 respectively corresponding to columns (or bit lines) or column pairs (or bit line pairs). Each of the page buffers 322 to 326 may include, for example, one or more latches.

The memory device 150 may be implemented as a two-dimensional or three-dimensional memory device. For example, as illustrated in FIG. 4, the memory device 150 may be implemented as a nonvolatile memory device with a three-dimensional stack structure. In this case, the memory device 150 may include a plurality of memory blocks BLK0 to BLKN−1.

FIG. 4 is a block diagram illustrating an example of memory blocks of memory device 150 shown in FIG. 1. Each of the memory blocks may have a three-dimensional structure (or vertical structure). For example, each of the memory blocks may have features extending in first to third directions (e.g., x-axis direction, y-axis direction, z-axis direction) to form a three-dimensional structure.

Each memory block 330 in the memory device 150 may include, for example, a plurality of NAND strings NS extending in the second direction and a plurality of NAND strings NS extending in the first and third directions. Each of the NAND strings NS may be coupled to a bit line BL, at least one string selection line SSL, at least one ground selection line GSL, a plurality of word lines WL, at least one dummy word line DWL, and a common source line CSL. Also, each of the NAND strings NS may include a plurality of transistor structures TS. In this patent document, the word "string" can be used to indicate a set of memory cells coupled in series. In some implementations, the NAND strings may include a set of flash memory cells coupled in series.

In each of the memory cell arrays 330, a plurality of NAND strings NS may be coupled to one bit line BL, such that a plurality of transistors can be implemented in one NAND string NS. Furthermore, the string select transistors SST of the respective NAND strings NS may be coupled to the corresponding bit line BL, and the ground select transistors GST of the respective NAND strings NS may be coupled to the common source line CSL. The memory cells MC may be provided between the string select transistors SST and the ground select transistors GST of the respective NAND strings NS. Thus, the memory cells may be implemented in each of the memory cell arrays 330 in the plurality of memory blocks of the memory device 150.

Figure 5:
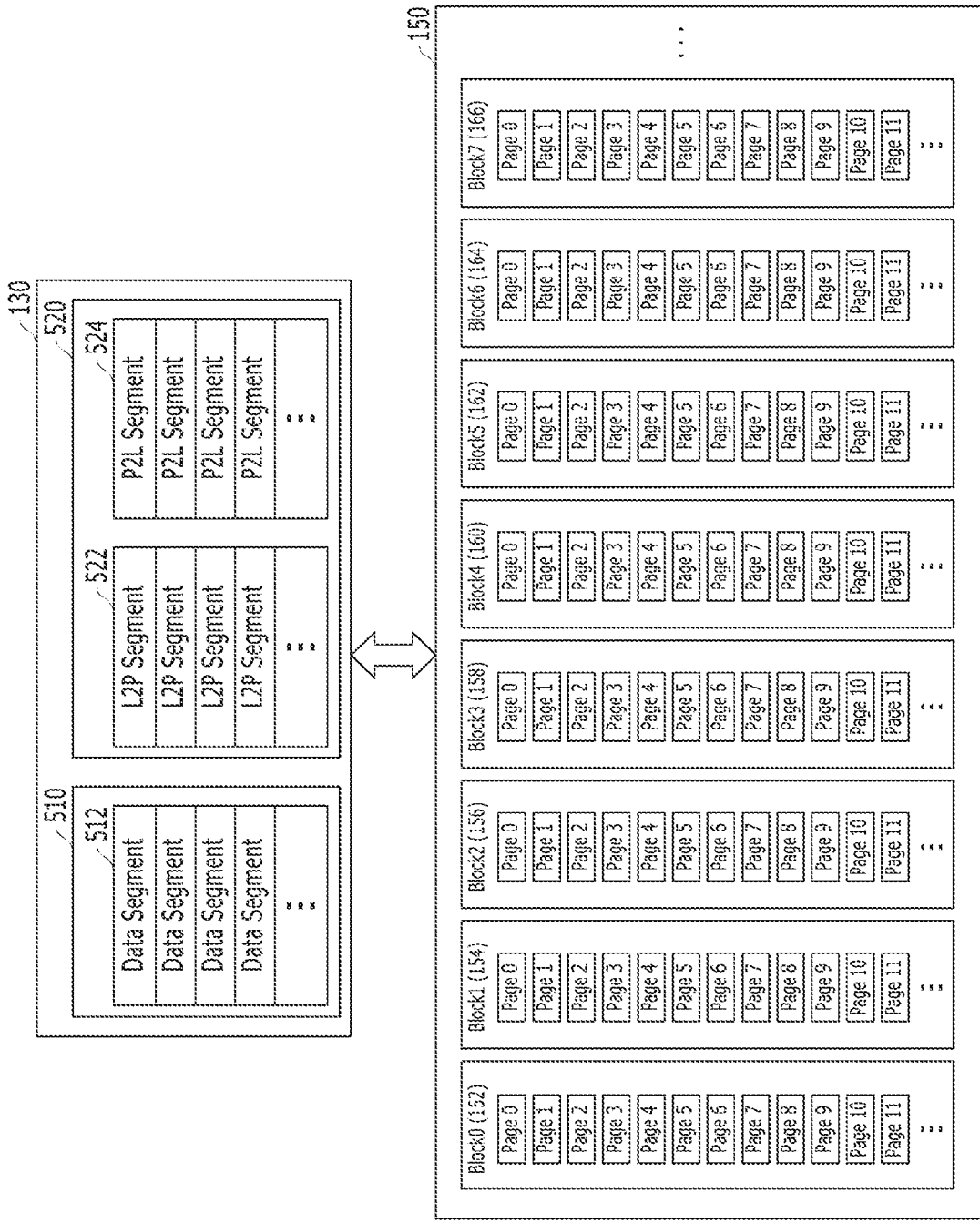
FIG. 5 is a diagram schematically illustrating an example method of performing a plurality of operations corresponding to a plurality of commands in a memory system based on some embodiments of the disclosed technology.
Figure 6:
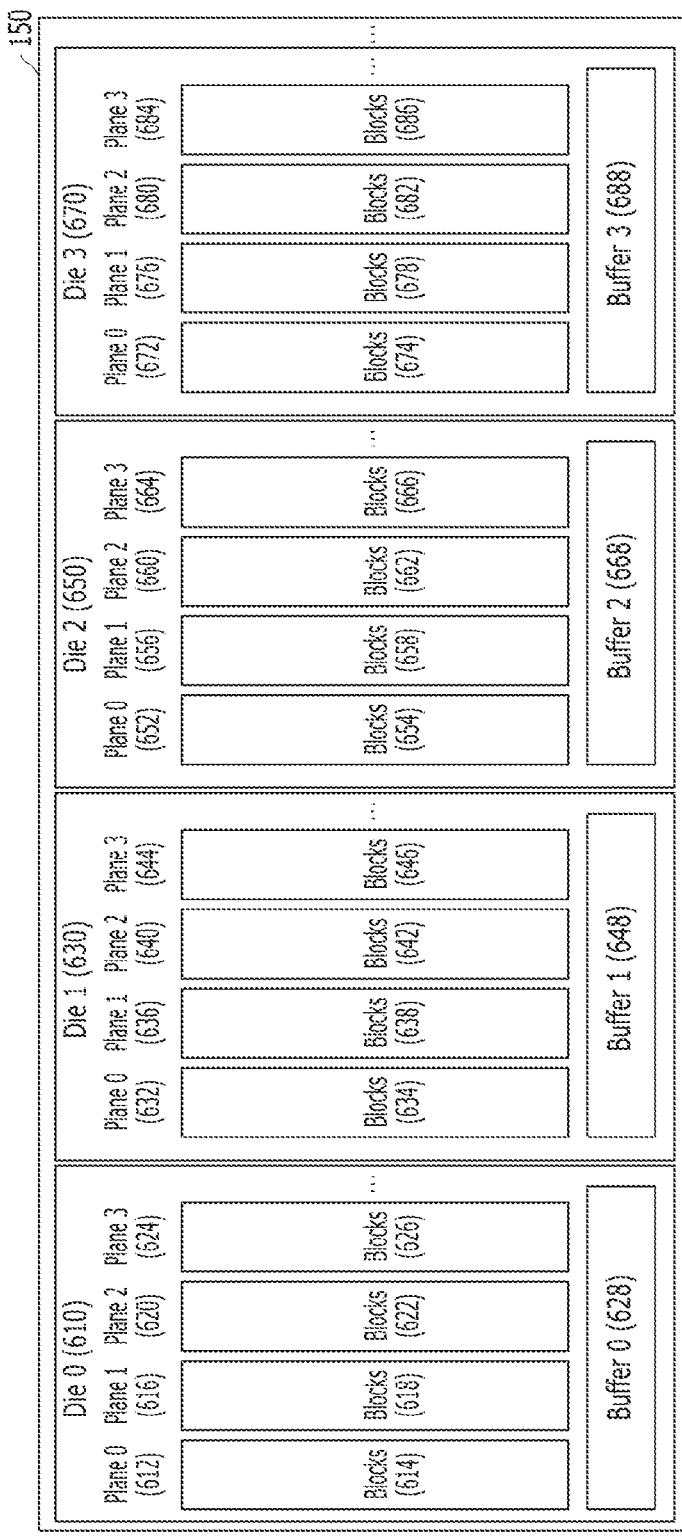
FIG. 6 is a diagram schematically illustrating another example method of performing a plurality of operations corresponding to a plurality of commands in a memory system based on some embodiments of the disclosed technology.

FIGS. 5 and 6 schematically illustrate an example method of performing a plurality of operations corresponding to a plurality of commands in the memory system according to an embodiment of the disclosed technology.

In some embodiments of the disclosed technology, the controller 130 performs operations corresponding to commands in the memory system 110. However, it is to be noted that, as described above, the processor 134 included in the controller 130 may perform operations corresponding to commands in the memory system 110 through, for example, an FTL (flash translation layer). Also, in some embodiments of the disclosed technology, the controller 130 stores user data and metadata corresponding to write commands entered from the host 102, in certain memory blocks among the plurality of memory blocks included in the memory device 150, reads user data and metadata corresponding to read commands received from the host 102, from certain memory blocks among the plurality of memory blocks included in the memory device 150, and provides the read data to the host 102, or erases user data and metadata, corresponding to erase commands entered from the host 102, from certain memory blocks among the plurality of memory blocks included in the memory device 150.

Metadata may include first map data including a logical/physical (L2P: logical to physical) information (hereinafter, referred to as a "logical information") and second map data including a physical/logical (P2L: physical to logical) information (hereinafter, referred to as a "physical information"), for data stored in memory blocks corresponding to a program operation. Also, the metadata may include information on command data corresponding to a command received from the host 102, information on an operation corresponding to the command, information on the memory blocks of the memory device 150 for which the operation is to be performed, and information on map data corresponding to the operation. That is, metadata may include all remaining information and data excluding user data corresponding to a command received from the host 102.

In an embodiment of the disclosed technology, in the case where the controller 130 receives a plurality of write commands from the host 102, program operations corresponding to the write commands are performed, and user data corresponding to the write commands are written and stored in empty memory blocks, open memory blocks, or free memory blocks for which an erase operation has been performed, among the memory blocks of the memory device 150. Also, first map data, including an L2P map table (mapping table) or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks, or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, in connection with the data segments of the user data which are stored in the memory blocks of the memory device 150, the controller 130 generates and updates the L2P segments of first map data and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

Further, in the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands is received from the host 102, the controller 130 checks memory blocks of the memory device 150 corresponding to the erase commands, and then performs erase operations for the memory blocks.

When operations corresponding to the plurality of commands received from the host 102 are performed while a background operation is being performed, the controller 130 loads and stores data corresponding to the background operation, that is, metadata and user data, in the buffer/cache included in the memory 144 of the controller 130, and then stores the data, that is, the metadata and the user data, in the memory device 150. Here, by way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, then store the metadata and user data, in certain other memory blocks of the memory device 150.

In the memory system in some embodiments of the disclosed technology, in the case of performing operations as foreground operations and a copy operation, a swap operation and a map flush operation as background operations, the controller 130 schedules queues corresponding to the foreground operations and the background operations and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in some embodiments of the disclosed technology, identifiers are assigned by respective operations for the memory device 150 and by functions for the memory device 150, and queues corresponding to the functions assigned with respective identifiers are scheduled.

In the memory system in some embodiments of the disclosed technology, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system implemented based on some embodiments of the disclosed technology, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 5, the controller 130 performs operations corresponding to a plurality of commands entered from the host 102, for example, program operations corresponding to a plurality of write commands entered from the host 102. Here, the controller 130 programs and stores user data corresponding to the write commands, in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and P2L segments as the physical segments of the second map data, then stores the L2P segments and the P2L segments in pages included in the memory blocks of the memory device 150.

For example, the controller 130 caches or buffers the user data corresponding to the write commands entered from the host 102, in a first buffer 510 included in the memory 144 of the controller 130. Particularly, after storing data segments 512 of the user data in the first buffer 510 working as a data buffer/cache, the controller 130 stores the data segments 512 stored in the first buffer 510 in pages included in the memory blocks of the memory device 150. As the data segments 512 of the user data corresponding to the write commands received from the host 102 are written (programmed) to the pages included in the memory blocks of the memory device 150, the controller 130 generates and updates the first map data and the second map data. The controller 130 stores the L2P segments and the P2L segments in a second buffer 520 included in the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Also, the controller 130 performs operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs operations corresponding to a plurality of commands entered from the host 102, for example, erase operations corresponding to a plurality of erase commands entered from the host 102. In particular, the controller 130 checks memory blocks corresponding to the erase commands among the memory blocks of the memory device 150 to carry out the erase operations for the checked memory blocks.

Referring to FIG. 6, the memory device 150 includes a plurality of memory dies, for example, a memory die 0, a memory die 1, a memory die 2 and a memory die 3. Each of the memory dies includes a plurality of planes, for example, a plane 0, a plane 1, a plane 2 and a plane 3. The respective planes in the memory dies included in the memory device 150 include a plurality of memory blocks, for example, N number of blocks Block0, Block1, . . . , BlockN−1 each including a plurality of pages, for example, 2 M number of pages. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

When performing operations corresponding to a plurality of commands received from the host 102, data corresponding to the operations are stored in the buffers included in the memory device 150. For example, when performing program operations, data corresponding to the program operations are stored in the buffers and then stored in the pages included in the memory blocks of the memory dies. When performing read operations, data corresponding to the read operations are read from the pages included in the memory blocks of the memory dies, then are stored in the buffers and provided to the host 102 through the controller 130.

In some embodiments of the disclosed technology, while it will be described below as an example that the buffers included in the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, in some embodiments of the disclosed technology, while it will be described below as an example that the buffers included in the memory device 150 are the plurality of buffer memory devices (e.g., page buffers) 322, 324 and 326 included in the memory device 150 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks, and operations corresponding to commands may be performed in the plurality of super memory blocks. Each of the super memory blocks may include a plurality of memory blocks, for example, memory blocks included in a first memory block group and a second memory block group. In this regard, when the first memory block group is included in the first plane of a certain first memory die, the second memory block group may be included in the first plane of the first memory die, be included in the second plane of the first memory die, or be included in the planes of a second memory die.

Figure 7:
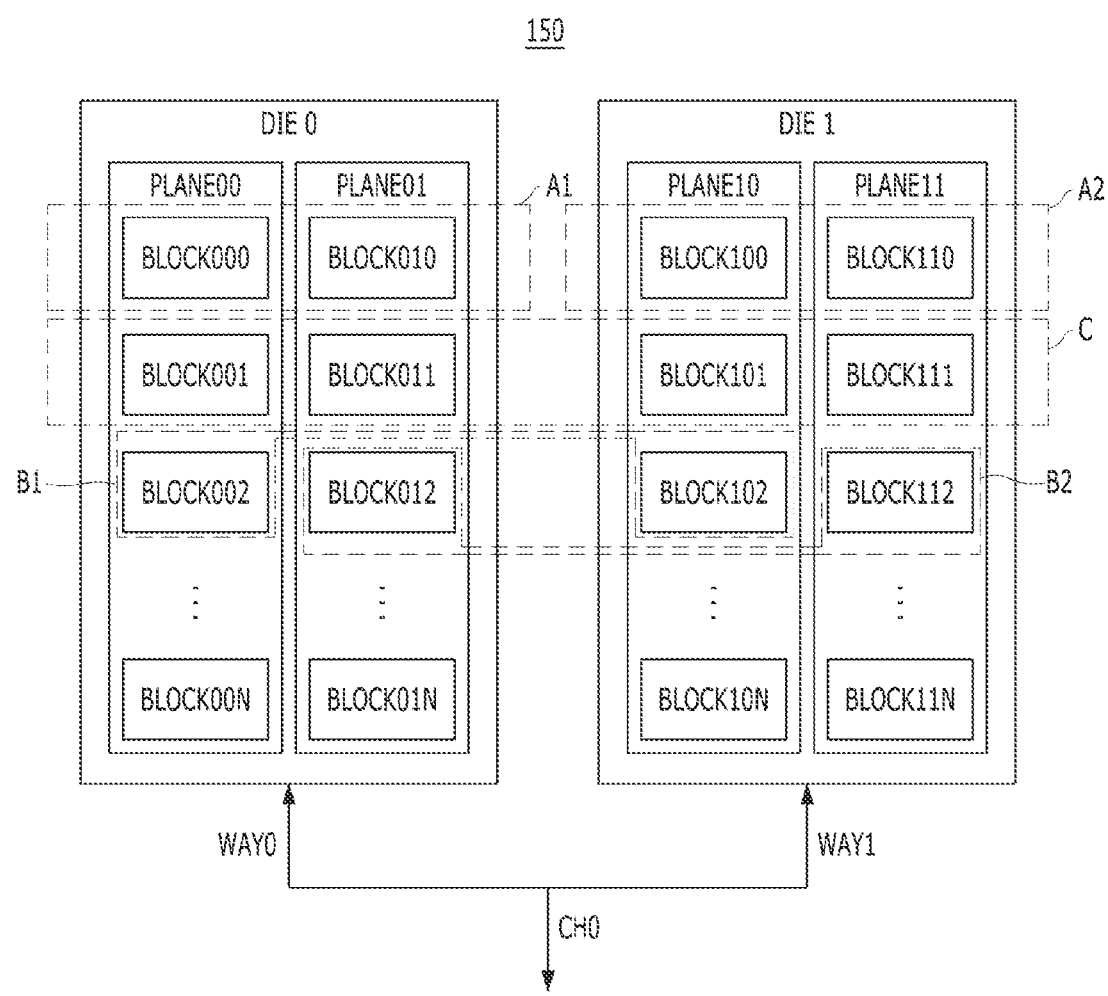
FIG. 7 is a block diagram illustrating an example of a super memory block that can be used in the memory system based on some embodiments of the disclosed technology.

FIG. 7 is a diagram illustrating an example of a super memory block that can be used in a memory system based on some embodiments of the disclosed technology.

FIG. 7 also illustrates certain elements of the memory device 150, among the elements of the memory system 110 shown in FIG. 1, based on some embodiments of the disclosed technology.

The memory device 150 may include a plurality of memory blocks, e.g., BLOCK000 to BLOCK00N, BLOCK010 to BLOCK01N, BLOCK100 to BLOCK10N and BLOCK110 to BLOCK11N.

In addition, the memory device 150 may include a first memory die DIE0 capable of inputting/outputting data through a zeroth channel CH0 and a second memory die DIE1 capable of inputting/outputting data through a first channel CH1.

FIG. 7 illustrates a part of a plurality of dies and a part of a plurality of channels. In an embodiment of the disclosed technology, the memory device 150 may include a third die (DIE2, not shown) and a fourth die (DIE3, not shown) that can receive or transmit data through the first channel CH0.

The zeroth and first channels CH0 and CH1 may input/output data in an interleaving scheme.

The first memory die DIE0 may include a plurality of planes PLANE00 and PLANE01 respectively corresponding to a plurality of ways WAY0 and WAY1. The ways WAY0 and WAY1 may input/output data in the interleaving scheme by sharing the zeroth channel CH0.

The second memory die DIE1 may include a plurality of planes PLANE 10 and PLANE 11 respectively corresponding to a plurality of ways WAY2 and WAY3. The ways WAY2 and WAY3 may input/output data in the interleaving scheme by sharing the first channel CH1. PLANE00 of DIE0 may include a set number of memory blocks, e.g., BLOCK000 to BLOCK00N, among the plurality of memory blocks. PLANE01 of DIE0 may include a set number of memory blocks, e.g., BLOCK010 to BLOCK01N, among the plurality of memory blocks.

PLANE10 of DIE1 may include a set number of memory blocks, e.g., BLOCK100 to BLOCK10N, among the plurality of memory blocks. PLANE11 of DIE1 may include a set number of memory blocks e.g., BLOCK110 to BLOCK11N, among the plurality of memory blocks.

In this manner, the plurality of memory blocks BLOCK000 to BLOCK00N, BLOCK010 to BLOCK01N, BLOCK100 to BLOCK10N and BLOCK110 to BLOCK11N in the memory device 150 may be divided into groups, according to their physical locations and their use of the ways and channels.

Although it is described above that the memory device 150 includes two dies, each including two planes, the invention is not limited to this configuration. The memory device 150 may include any suitable number of dies, each having any suitable number of planes, which numbers may be determined based on system or use requirements. Either or both of such requirements may also be used to determine how many blocks are to be included in each plane.

The memory blocks, however, need not be managed based on their physical locations. Rather, the controller 130 may manage the plurality of memory blocks on a basis of which memory blocks are simultaneously selected and operated. In other words, the controller 130 may manage a plurality of memory blocks which are located in different dies or different planes based on their physical locations, by grouping memory blocks capable of being selected simultaneously and thereby dividing the grouped memory blocks into super memory blocks.

The simultaneous selection scheme of grouping the memory blocks into super memory blocks by the controller 130 may be performed in various ways based on system design or other relevant considerations. Herein, three simultaneous selection schemes are provided by way of example.

A first scheme is to group an certain memory block BLOCK000 from the first plane PLANE00 and a certain memory block BLOCK010 from the second plane PLANE01 of the first memory die DIE0 in the memory device 150 and manage the grouped memory blocks BLOCK000 and BLOCK010 as a single super memory block A1. When this first scheme is applied to the second memory die DIE1, the controller 130 may group a certain memory block BLOCK100 from the first plane PLANE10 and a certain memory block BLOCK110 from the second plane PLAN E11 of the second memory die DIE1 and manage the grouped memory blocks BLOCK100 and BLOCK110 as a single super memory block A2.

A second scheme is to group a certain memory block BLOCK002 from the first plane PLANE00 of the first memory die DIE0 and a certain memory block BLOCK102 from the first plane PLANE10 of the second memory die DIE1 and manage the grouped memory blocks BLOCK002 and BLOCK102 as a single super memory block B1. In addition, according to the second scheme, the controller 130 may group an certain memory block BLOCK012 from the second plane PLANE01 of the first memory die DIE0 and a certain memory block BLOCK112 from the second plane PLANE11 of the second memory die DIE1 and manage the grouped memory blocks BLOCK012 and BLOCK112 as a single super memory block B2.

A third scheme is to group an certain memory block BLOCK001 from the first plane PLANE00 of the first memory die DIE0, an certain memory block BLOCK011 from the second plane PLANE01 of the first memory die DIE0, an certain memory block BLOCK101 from the first plane PLANE10 of the second memory die DIE1, and a certain memory block BLOCK111 from the second plane PLANE11 of the second memory die DIE1 and manage the grouped memory blocks BLOCK001, BLOCK011, BLOCK101 and BLOCK111 as a single super memory block C.

Memory blocks in the respective super memory blocks may be simultaneously selected by the controller 130 through an interleaving scheme, for example, a channel interleaving scheme, a memory die interleaving scheme, a memory chip interleaving scheme or a way interleaving scheme.

Figure 8:
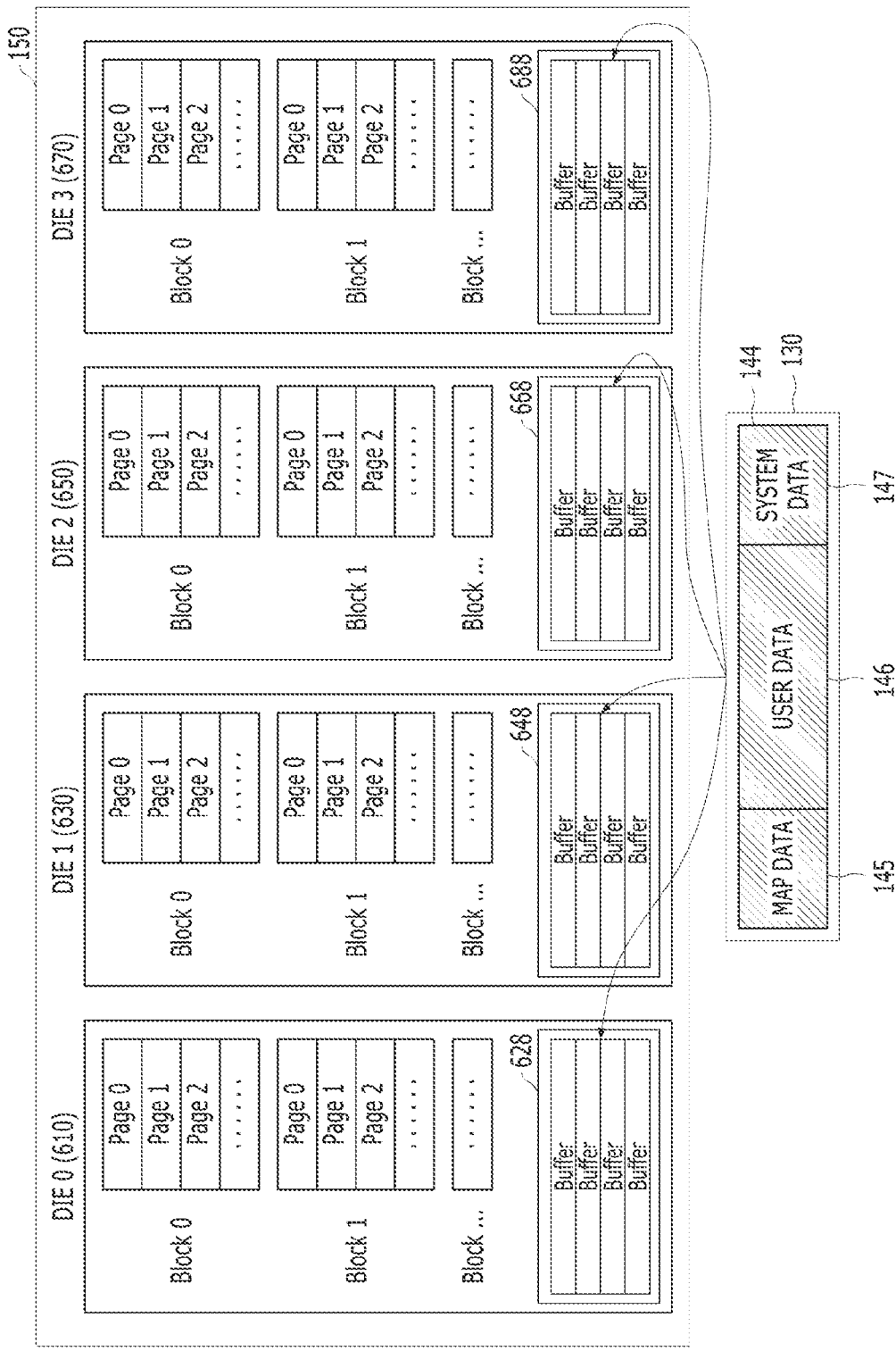
FIG. 8 is a diagram illustrating an example of page buffers that can write or read data from or to a memory device.

FIG. 8 is a diagram illustrating that data is read from the memory device 150 or data to be written or programmed is stored in the memory device 150, by using the memory 144 of the controller 130 and the page buffers 628, 648, 668 and 688 of the memory device 150.

FIG. 8 does not illustrate planes each including blocks for brevity, and illustrates that data is read from the memory device 150 or data to be written or programmed is stored in the memory device 150, by using the memory 144 of the controller 130 and page buffers included in each die of the memory device 150.

Referring to FIG. 8, the memory 144 of the controller 130 may include a map data area 145 for storing map data, a user data area 146 for storing user data, and a system data area 147 for storing system data. Each of the data may be transferred to the memory 144 of the controller 130 through the page buffers included in each die of the memory device 150 or to the respective page buffers 628, 648, 668 and 688 of the dies through the memory 144 of the controller 130. In other words, during a program operation of the memory device 150, data stored in the memory 144 of the controller 130 are stored in the page buffers 628, 648, 668 and 688, and during a read operation of the memory device 150, data read from blocks of the memory device 150 are stored in the page buffers 628, 648, 668 and 688, and then transferred to the memory 144 of the controller 130. Hereinafter, the memory 144 of the controller 130 is referred to as a cache memory 144.

Since the entire cache memory 144 is currently in use and has no buffer space for a garbage collection operation, it is necessary to delete the map data or the user data from the cache memory 144 in order to secure a buffer space for performing the garbage collection operation. When the map data is deleted to secure the buffer space, the map data has to be read again from the memory device 150 and stored in the cache memory 144 after the garbage collection operation is performed, and when the user data is deleted to secure the buffer space, the garbage collection operation has to be performed after the user data is programmed into the memory device 150, and the programmed user data has to be read again from the memory device 150. Consequently, in these cases, a great deal of latency may occur.

Also, installing an additional cache memory for the garbage collection operation may increase the size and cost of the memory system.

FIGS. 9A to 9G are diagrams illustrating a garbage collection operation using page buffers of the memory device 150 based on some embodiments of the disclosed technology.

Although planes constituting a block are not illustrated in FIGS. 9A to 9G for convenience in description, the disclosed technology may be applied regardless of the number of planes. In other words, one die may include a plurality of planes, and one plane may include page buffers according to the number of data bits of a multi-bit cell. For example, assuming that a multi-bit cell of the memory device 150 includes 3-bit data and one die includes two planes, each of the planes may include three page buffers, that is, a least significant bit (LSB) page buffer, a central significant bit (CSB) page buffer and a most significant bit (MSB) page buffer.

In addition, although FIGS. 9A to 9G, show the garbage collection operation as an example, and the disclosed technology is not limited thereto.

In other words, the disclosed technology may be applied not only to the garbage collection operation but also to other operations such as a wear-leveling operation or a read reclaim operation.

Figure 9A:
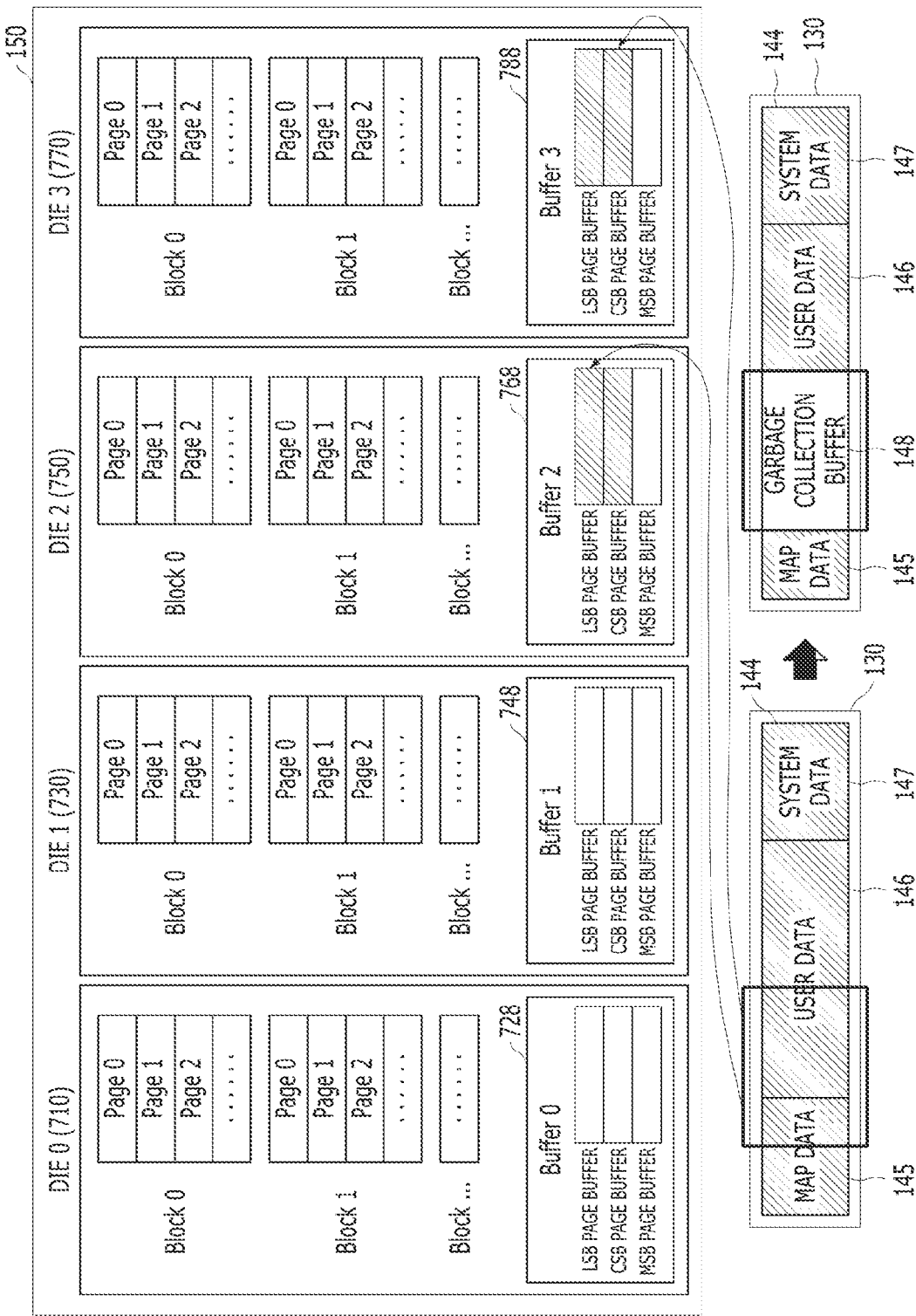
FIGS. 9A to 9G are diagrams illustrating examples of a garbage collection operation that uses page buffers of the memory device 150 based on some embodiments of the disclosed technology.

Referring to FIG. 9A, the controller 130 may secure a buffer space for the garbage collection operation by using page buffers 728, 748, 768 and 788 of the memory device 150. Specifically, the controller 130 may store a portion of map data stored in the map data area 145 of the cache memory 144 and a portion of user data stored in the user data area 146 of the cache memory 144 in the page buffers 728, 748, 768 and 788 of the memory device 150, and thus secure a garbage collection buffer 148, which is the buffer space for the garbage collection operation.

The page buffers 728, 748, 768 and 788 of the memory device 150 for storing the data from the cache memory 144 may include the page buffers 728, 748, 768 and 788 for storing data for an LSB, a CSB and an MSB of a multi-level cell. Although it is described that the multi-level cell stores 3-bit data by way of example, the disclosed technology is not limited thereto, and the memory device 150 may include the page buffers 728, 748, 768 and 788 for storing data in a case where the multi-level cell stores 2-bit data or 4 or more-bit data.

Hereinafter, by way of example only, the multi-level cell that stores 3-bit data will be discussed, and the page buffers in this case are referred to as an LSB page buffer, a CSB page buffer and an MSB page buffer.

When the memory device 150 includes the multi-level cell, the memory device 150 may perform a one-shot program operation on the multi-level cell. In one example, the one-shot program operation can include programming a plurality of data bits into the multi-level cell through a single program operation.

When all the page buffers constituting the multi-level cell are filled with data, the memory device 150 may perform the one-shot program operation, and when data of the cache memory 144 fills only some of the page buffers, the memory device 150 may not perform the program operation. In other words, some of the page buffers may be used for storing the data from the cache memory 144. Each plane or die may function as a data storage area. For example, each of die 0 710, die 1 730, die 2 750 and die 3 770 may function as one data storage device.

In some embodiments, one data storage may include a plurality of dies or a plurality of planes. That is, one data storage may include at least one die or at least one plane.

Figure 9B:
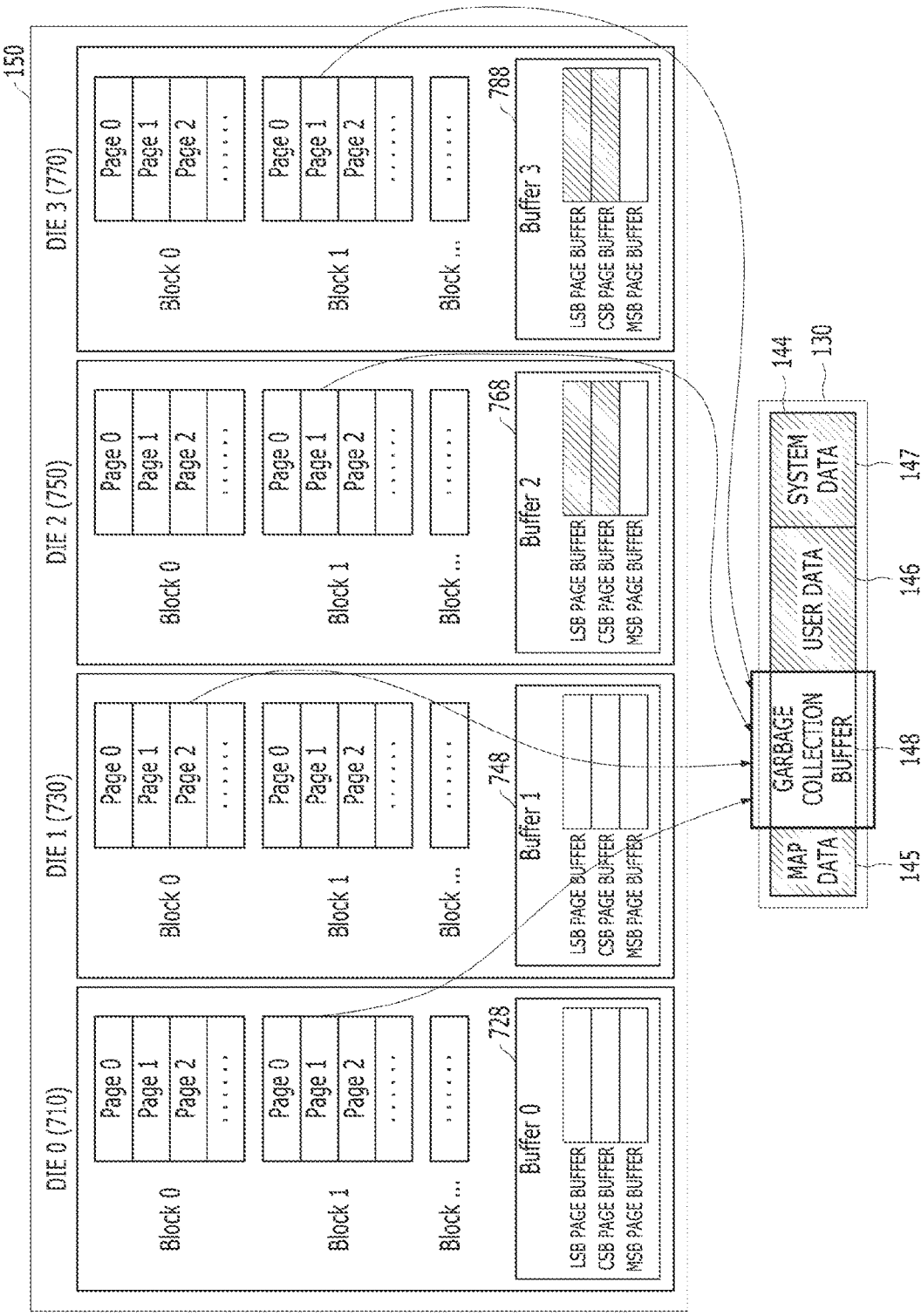

FIG. 9B is a diagram illustrating reading data stored in a block of each die into a buffer for garbage collection after data is stored in a page buffer of the memory device 150.

Referring to FIG. 9B, when only some of the page buffers are already filled with data, for example, only the LSB page buffers or the CSB page buffers are already filled with data, the memory device 150 may not perform the one-shot program operation but may perform a read operation using the other page buffers. Accordingly, the memory device 150 may read valid data for performing the garbage collection operation on all dies in an interleaving manner, and store the read valid data in the garbage collection buffer 148.

In other words, as illustrated in FIG. 9B, when the LSB page buffers and the CSB page buffers, corresponding to the die 2 and the die 3, are filled with the data stored in the cache memory 144, valid data of the die 2 and the die 3 may be stored in the garbage collection buffer 148 through the MSB page buffers of the die 2 and the die 3.

In order to perform the garbage collection operation, the memory device 150 may store valid data of page 1 of block 1 of the die 0 in the garbage collection buffer 148, and store valid data of page 2 of block 0 of the die 1 in the garbage collection buffer 148. In this case, unlike examples of the die 2 and 3, the valid data of the die 0 and die 1 may be stored by using at least one buffer memory device among all the buffer memory devices of the die 0 and die 1, and then be stored in the garbage collection buffer 148.

The memory device 150 stores the valid data of page 1 of block 1 of the die 2 in the garbage collection buffer 148, and stores the valid data of page 1 of block 1 of the die 3 in the garbage collection buffer 148.

In this way, the memory device 150 may read valid data from each die and store the read valid data in the garbage collection buffer 148 until the garbage collection buffer 148 is completely filled.

In the case of the die 2 and die 3, the memory device 150 may not perform a program operation on the die 2 and die 3 because data are present in the page buffers, but may perform a read operation simultaneously on all the dies. That is, the memory device 150 may perform the read operation on all the dies in a full-die interleaving manner even though data are present in some of the page buffers.

When the memory device 150 performs the read operation, the memory device 150 may store valid data read from blocks in page buffers with no data stored, and then store the valid data in the garbage collection buffer 148 of the cache memory 144. The page buffers with no data stored may be a page buffer in which data from the cache memory 144 is not stored.

Figure 9C:
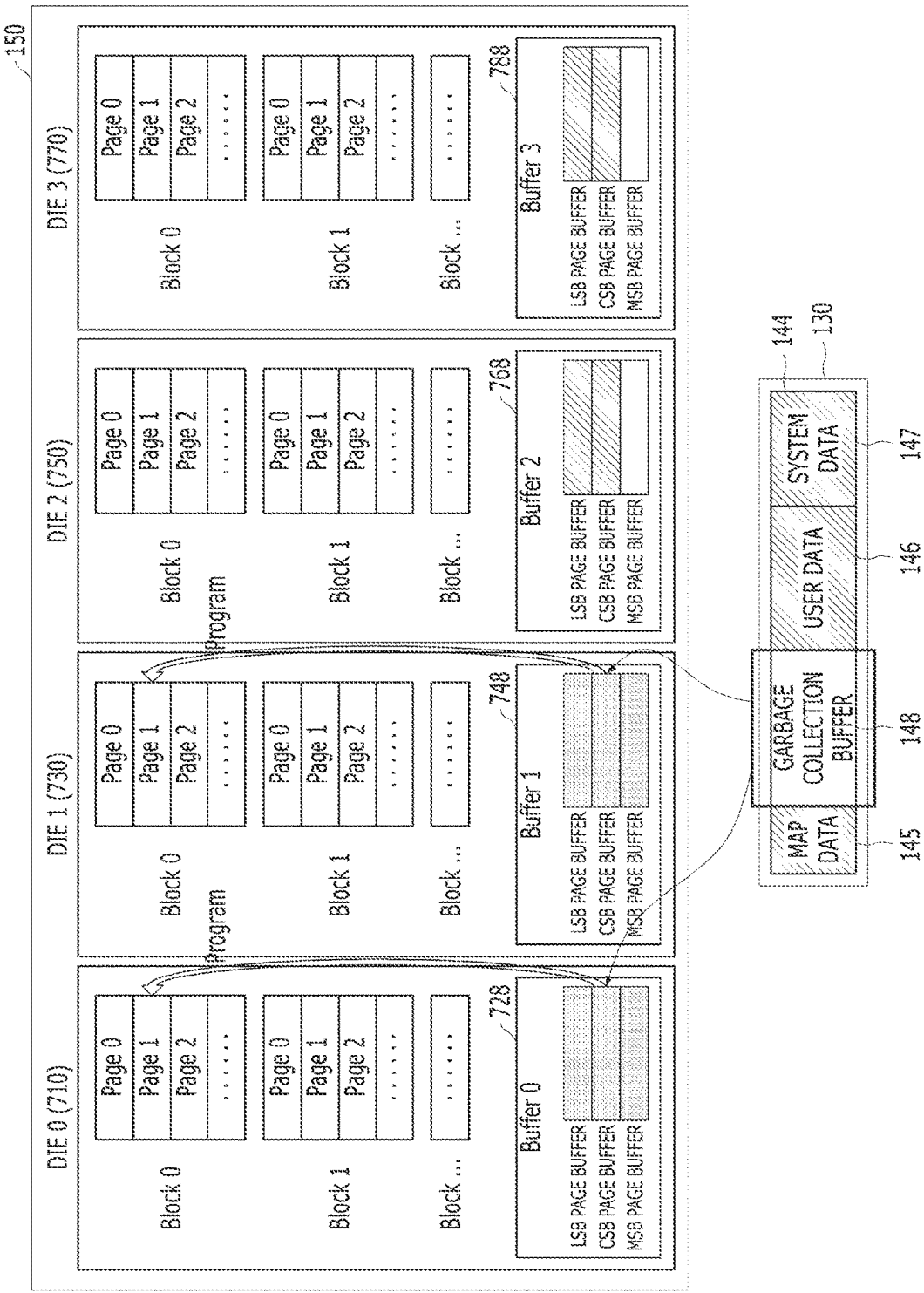

FIG. 9C is a diagram illustrating that the program operation is performed on some dies by using data stored in the garbage collection buffer 148. Referring to FIG. 9C, the controller 130 may store the data of the garbage collection buffer 148 of the cache memory 144 in the respective page buffers 728 and 748 of the die 0 and the die 1, and program the data stored in the page buffers 728 and 748 into pages of respective blocks.

For example, the memory device 150 may program the data stored in the page buffer 728 of the die 0 into page 1 of block 0 of the die 0, and program the data stored in the page buffer 748 of the die 1 into page 1 of the block 0 of the die 1. In this case, only some of the page buffers of the die 2 and die 3 are used. That is, since some data moved from the map data area 145 or the user data area 146 of the cache memory 144 are stored in the LSB page buffers and the CSB page buffers, the memory device 150 may not perform the program operation on the die 2 and the die 3.

Contrary to this, when the memory device 150 programs the pages of the die 0 and die 1, the memory device 150 may program the pages by using the page buffers 728 and 748 for all bits of the multi-level cell.

Figure 9D:
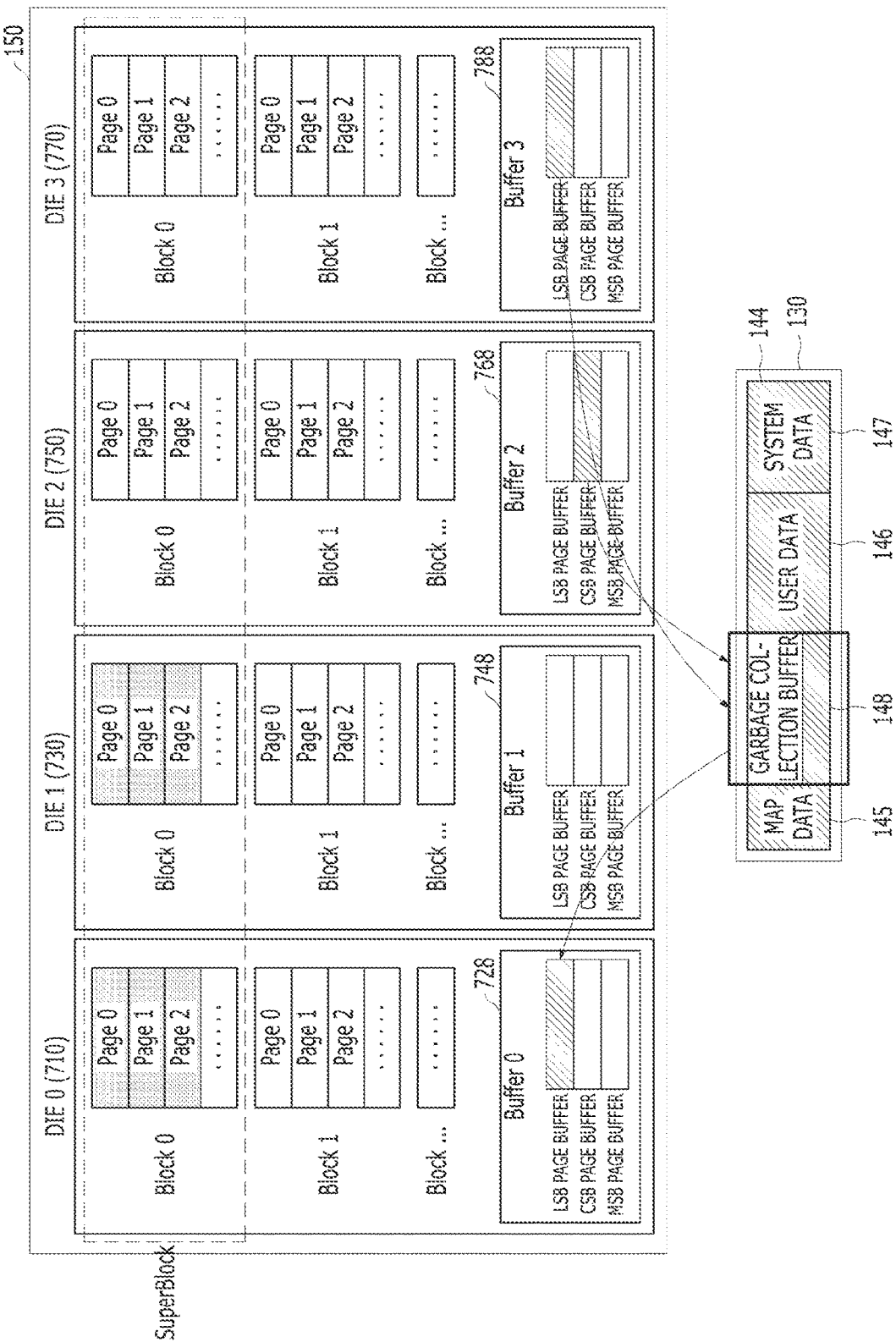

Referring to FIG. 9D, the memory device 150 completely performs the program operation on the die 0 and the die 1, so that page 0, page 1 and page 2 of the block 0 of the die 0 are completely programmed, and page 0, page 1 and page 2 of the block 0 of the die 1 are completely programmed.

The controller 130 may read and program the same blocks of the respective dies at the same time, and the blocks of the dies may be controlled in a unit of superblock. That is, the superblock may include blocks at the same location or blocks at different locations in the respective dies as illustrated in FIG. 7.

Since the controller 130 can read and program the superblock, the controller 130 may also perform the program operation on the die 2 and the die 3. However, in this case, since the data moved from the cache memory 144 of the controller 130 are stored in the page buffers of the die 2 and die 3, the data stored in the page buffers of the die 2 and die 3, that is, the data from the cache memory 144, have to be moved to some page buffers of the die 0 or the die 1 so that the memory device 150 performs the program operation on the die 2 and die 3.

Referring to FIG. 9D, the controller 130 may store the data stored in the LSB page buffer or the CSB page buffer of the die 2 in the garbage collection buffer 148, and then store the data again in the page buffer 728 of the die 0 or the page buffer 748 of the die 1. In addition, the controller 130 may store the data stored in the LSB page buffer or the CSB page buffer of the die 3 in the garbage collection buffer 148, and then store the data in the page buffer 728 of the die 0 or the page buffer 748 of the die 1.

Figure 9E:
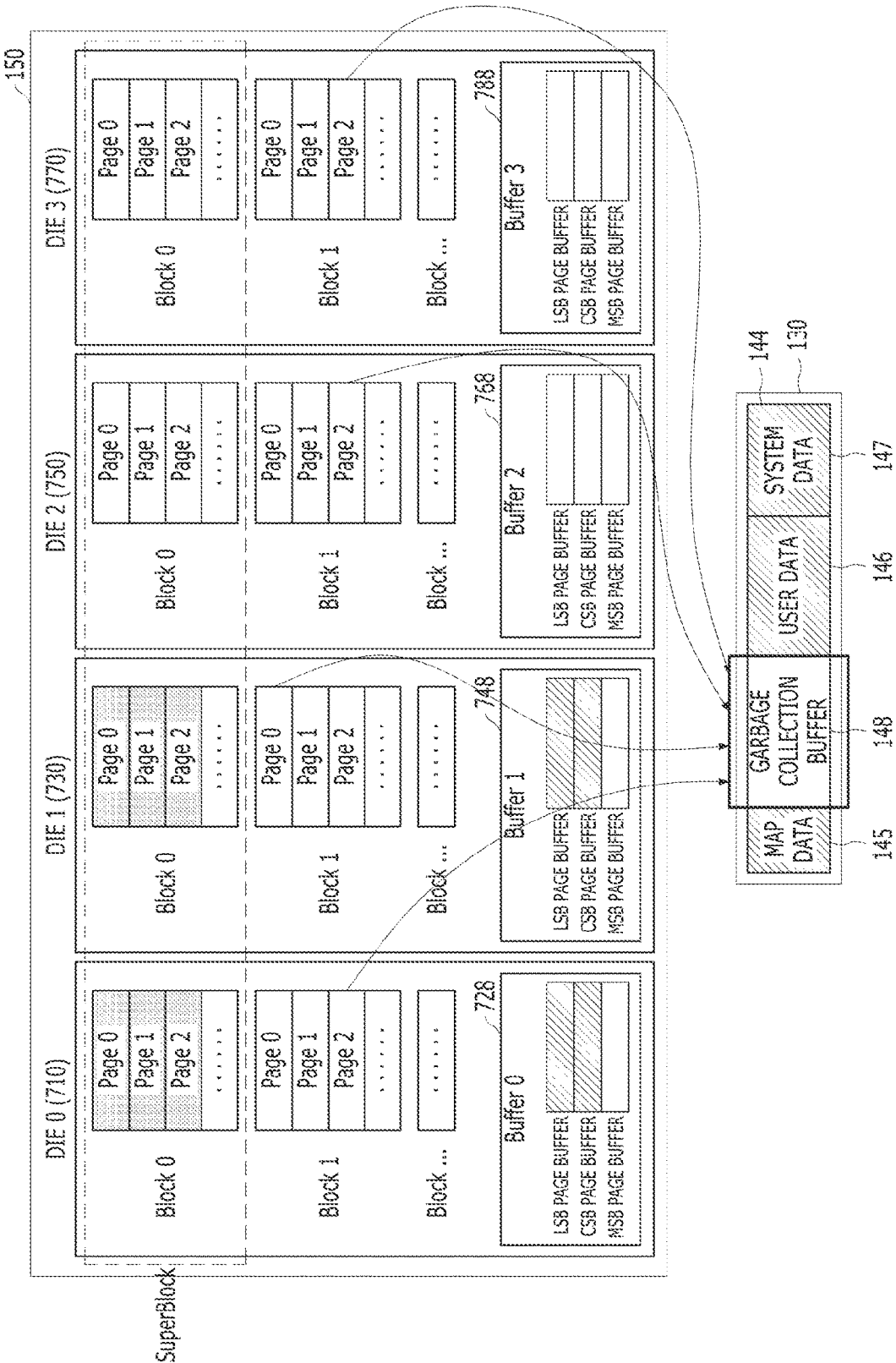

FIG. 9E is a diagram illustrating that data is read from each die, and the read data is stored in the garbage collection buffer 148 of the controller 130 in order to perform the program operation on the die 2 and the die 3.

As described above, the memory device 150 may simultaneously perform the read operation on each die in the full-die interleaving manner, and store the data obtained through the read operation in the garbage collection buffer 148. For example, the memory device 150 may read valid data of page 2 of the block 1 of the die 0, and store the valid data in the garbage collection buffer 148 of the cache memory 144, and the memory device 150 may read valid data of page 0 of block 1 of the die 1, and store the valid data in the garbage collection buffer 148 of the cache memory 144.

In other words, when the data moved from the cache memory 144 fills the LSB page buffers and the CSB page buffers corresponding to the die 0 and the die 1 as illustrated in FIG. 9E, the valid data of the die 0 and die 1 may be stored in the garbage collection buffer 148 through the MSB page buffers of the die 0 and die 1.

In addition, the memory device 150 may read valid data of page 2 of the block 1 of the die 2 and store the valid data in the garbage collection buffer 148, and read valid data of page 2 of the block 1 of the die 3 and store the valid data in the garbage collection buffer 148. Unlike examples of the die 0 and die 1, the valid data of the die 2 and die 3 may be stored by using all the bit page buffers of the die 2 and 3, and then stored in the garbage collection buffer 148.

Figure 9F:
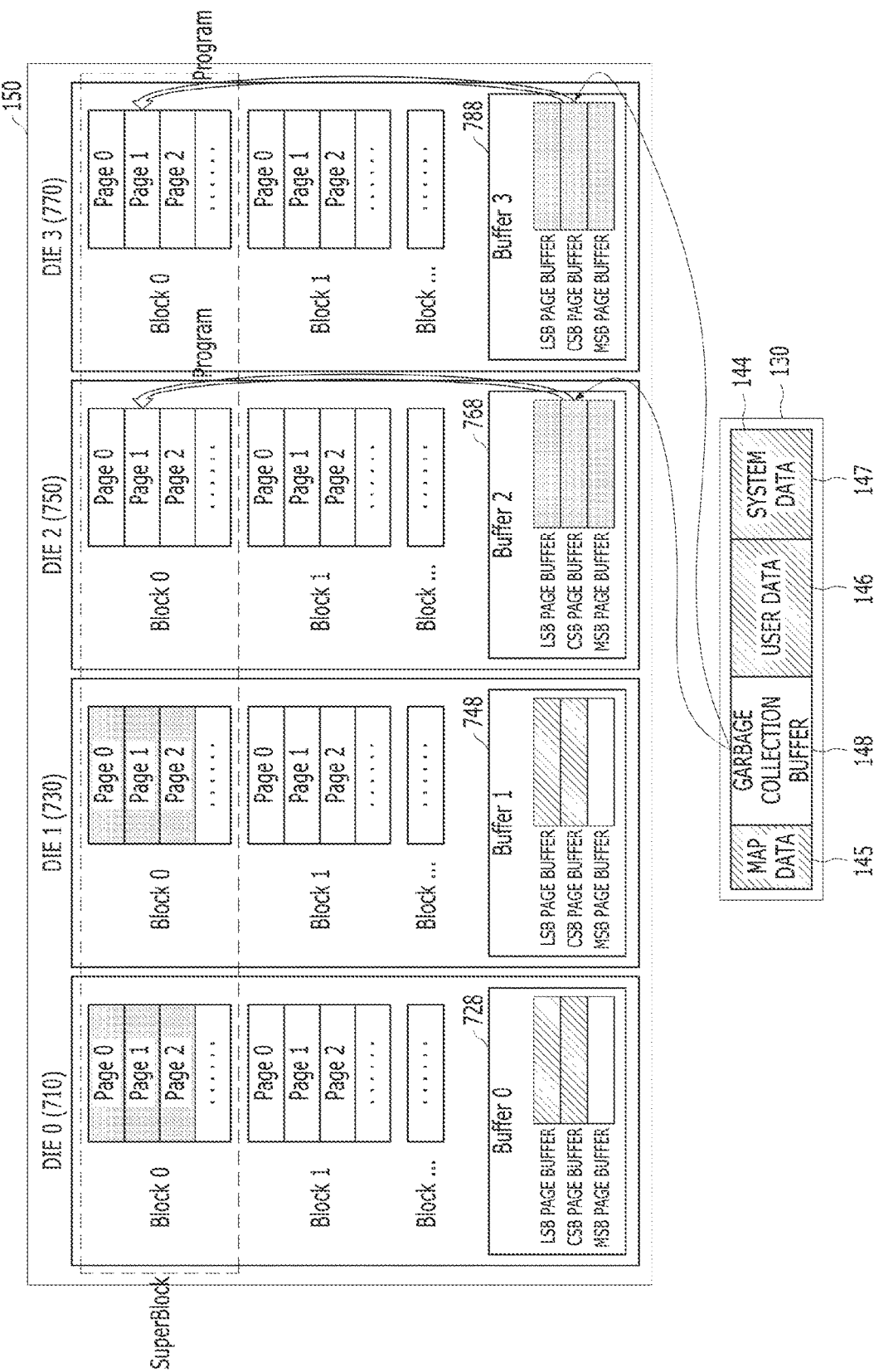

FIG. 9F is a diagram illustrating that the program operation is performed on the die 2 and the die 3. Referring to FIG. 9F, the controller 130 may store the data of the garbage collection buffer 148 in all the page buffers of the die 2. In addition, the controller 130 may store the data of the garbage collection buffer 148 in all the page buffers of the die 3. The controller 130 may simultaneously store the data for the program operation in the page buffers 768 and 788 of the die 2 and die 3 in the full-die interleaving manner, and the memory device 150 may perform the program operation on the die 2 by using the data stored in the page buffer 768 of the die 2, that is, the LSB page buffer, the CSB page buffer and the MSB page buffer, and perform the program operation on the die 3 by using the data stored in the page buffer 788 of the die 3, that is, the LSB page buffer, the CSB page buffer and the MSB page buffer.

Referring to FIG. 9F, the memory device 150 may program page 1 of block 0 of the die 2 by using the data stored in the page buffer 768 of the die 2, that is, the LSB page buffer, the CSB page buffer and the MSB page buffer, and program page 1 of block 0 of the die 3 by using the data stored in the page buffer 788 of the die 3, that is, the LSB page buffer, the CSB page buffer and the MSB page buffer. The program operation may be simultaneously performed on the die 2 and the die 3.

Figure 9G:
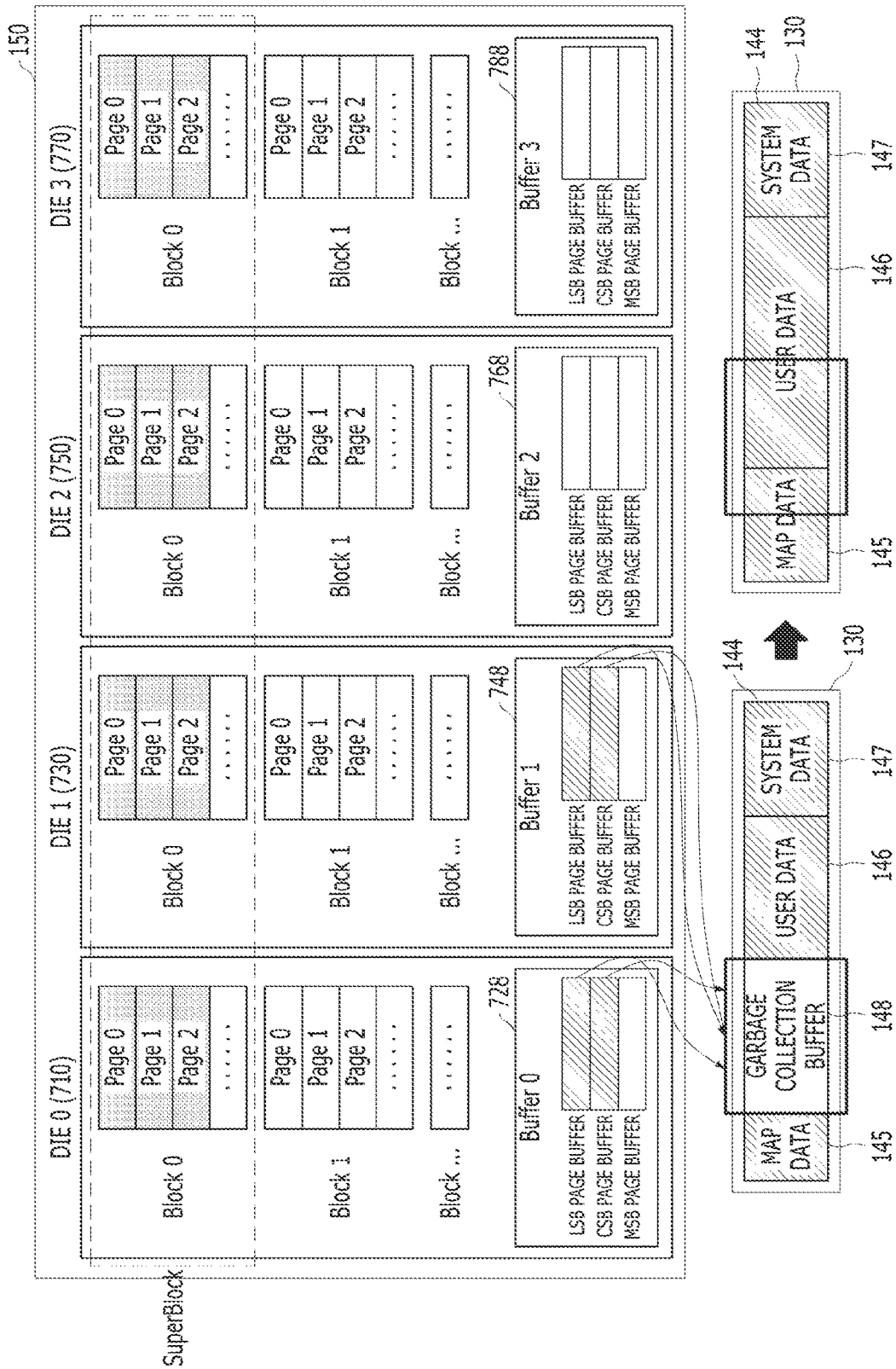

FIG. 9G is a diagram illustrating the data stored in the LSB page buffers or the CSB page buffers are recovered to the cache memory 144 after the garbage collection operation is completely performed.

FIG. 9G illustrates that the garbage collection operation is completely performed by performing the program operation on the blocks at the same location of each die corresponding to the superblock, that is, the block 0 of the die 0, the block 0 of the die 1, the block 0 of the die 2 and the block 0 of the die 3, and subsequently the memory 144 may recover the data stored in the LSB page buffers and CSB page buffers of the die 0 and die 1 to the cache memory 144 of the controller 130.

Referring to FIG. 9G, the memory device 150 may move the data stored in the LSB page buffer and CSB page buffer of the die 0 and the data stored in the LSB page buffer and CSB page buffer of the die 1 to the garbage collection buffer 148 of the cache memory 144. The data, which are the data read from the map data area 145 and/or the user data area 146 as described with reference to FIG. 9A, are not limited to the map data and/or the user data, and may include different types of data.

After moving the data stored in the LSB page buffers and the CSB page buffers to the garbage collection buffer 148, the controller 130 may release allocation of the garbage collection buffer 148, and complete the garbage collection operation.

As described above, the controller 130 and the memory device 150 may perform the garbage collection operation by using the page buffers of the memory device 150 without allocating a separate space for the garbage collection operation.

Although the garbage collection operation is described as an embodiment of the disclosed technology, this is merely an example, and the disclosed technology is not limited thereto. That is, the garbage collection buffer 148 and the LSB, CSB and MSB page buffers of the disclosed technology may be used as temporary buffers that can temporarily store data in order to perform the wear-leveling or read reclaim operation, and the data stored in the temporary buffers may be programmed into blocks of the memory device 150.

Figure 10:
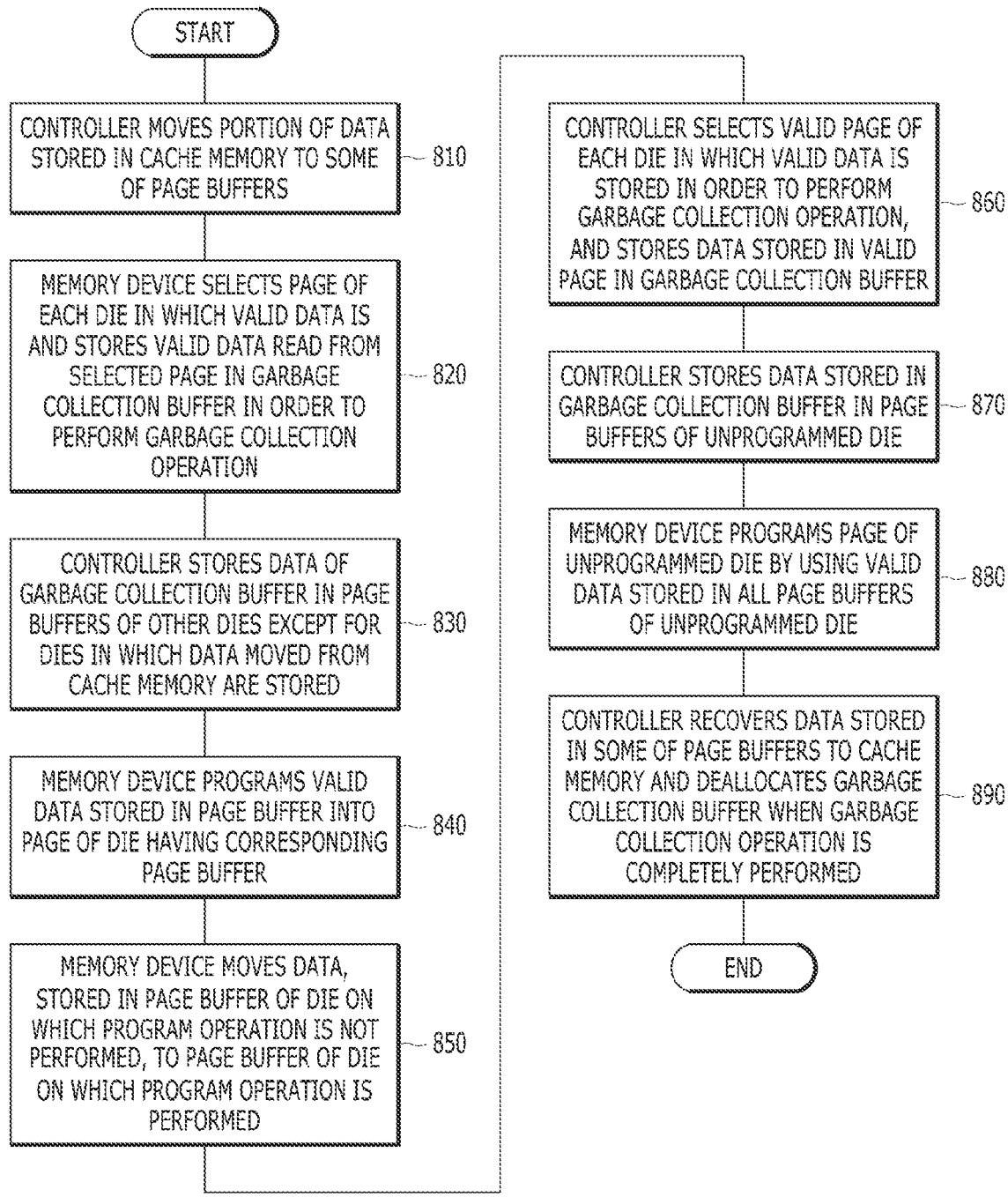
FIG. 10 is a flowchart illustrating an example of a garbage collection operation that uses page buffers based on some embodiments of the disclosed technology.

FIG. 10 is a flowchart illustrating an example of a garbage collection operation using page buffers based on some embodiments of the disclosed technology.

Referring to FIGS. 1 and 10, at 810, the controller 130 transfers a portion of data stored in the cache memory 144 to some of the page buffers. Using some of the page buffers indicates using certain page buffers without using all the page buffers. For example, only LSB page buffers or only MSB page buffers are used or only LSB page buffers and CSB page buffers are used without using all the page buffers.

The controller 130 may transfer a portion of data stored in the cache memory to page buffers included in some of the memory dies. For example, when the memory device 150 includes die 0 to die 3, the controller 130 may move a portion of data stored in the cache memory 144 of the controller 130 to the page buffers of the die 2 and die 3.

When a portion of data is transferred from the cache memory 144 of the controller 130, a corresponding area in which data have been stored may be used as the garbage collection buffer 148 for the garbage collection operation.

At 820, in order to perform the garbage collection operation, the memory device 150 may select a page of each die in which valid data is stored, and store the valid data read from the selected page in the garbage collection buffer 148.

At 830, the controller 130 may store data of the garbage collection buffer 148 in page buffers of the other dies except for the dies in which the data moved from the cache memory 144 are stored. For example, when map data or user data is stored in the LSB page buffers and MSB page buffers of the die 2 and die 3, the controller 130 may store valid data for the garbage collection operation in all the page buffers of the die 0 and die 1. In this case, the valid data stored in the page buffers is needed to immediately perform the program operation. Since the read operation is not performed again after the data are stored in the page buffers, it is not necessary to store data by using only some page buffers.

At 840, the memory device 150 may program valid data stored in a page buffer into a page of a die having a corresponding page buffer. Taking the operation 830 as an example, the memory device 150 may program the valid data stored in all the page buffers of the die 0 and die 1 into pages of the die 0 and die 1, respectively.

At 850, the memory device 150 may move data, stored in a page buffer of a die on which the program operation is not performed, to a page buffer of a die on which the program operation is performed. For example, when the program operation is performed on the die 0 and die 1, and the data, i.e., map data and user data, moved from the memory 144 of the controller 130 are stored in the LSB page buffers and CSB page buffers of the die 2 and die 3, the controller 130 may move the data stored in the page buffers of the die 2 and die 3 to the garbage collection buffer 148, and then move the data back to the page buffers of the die 0 and die 1.

At 860, the controller 130 may select a valid page of each die in which valid data is stored in order to perform the garbage collection operation, and store the data stored in the valid page in the garbage collection buffer 148.

At 870, the controller 130 may store the data stored in the garbage collection buffer 148 in page buffers of an unprogrammed die. Taking the above-described operation 840 as an example, since the program operation is completely performed on the die 0 and die 1, the controller 130 may store the valid data stored in the garbage collection buffer 148 in all the page buffers of the die 2 and 3.

At 880, the memory device 150 may program a page of the unprogrammed die by using the valid data stored in all the page buffers of the unprogrammed die.

At 890, when the garbage collection operation is completely performed, the controller 130 may recover the data, which have been moved from the cache memory 144 and stored in some of the page buffers, to the cache memory 144, and deallocate the garbage collection buffer 148.

Although it is illustrated in FIG. 10 that the garbage collection operation is performed by way of example, and the disclosed technology is not limited thereto. That is, the garbage collection buffer 148 and the LSB, CSB and MSB page buffers based on some embodiments of the disclosed technology may be used as temporary buffers that can temporarily store data, in order to perform the wear-leveling or read reclaim operation, and the data stored in the temporary buffer may be used to program blocks of the memory device 150.

As described above, in some embodiments of the disclosed technology, the garbage collection operation can be efficiently performed by using the page buffers of the memory device without clearing a cache memory space for the garbage collection operation.

Hereinafter, with reference to FIGS. 11 to 19, data processing system and electronic devices to which the memory system 110 including the memory device 150 and the controller 130 described with reference to FIGS. 1 to 10 is applied will be discussed.

Figure 11:
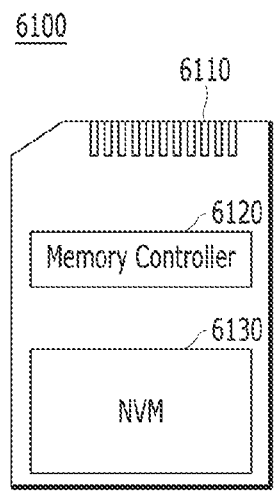
FIG. 11 is a diagram schematically illustrating an example of a data processing system that includes a memory system based on some embodiments of the disclosed technology.

In FIG. 11, another example of the data processing system including the memory system is illustrated. FIG. 11 schematically illustrates a memory card system to which the memory system is applied.

Referring to FIG. 11, the memory card system 6100 may include a memory controller 6120, a memory device 6130 and a connector 6110.

The memory controller 6120 may be connected to the memory device 6130 such as a nonvolatile memory. The memory controller 6120 may be configured to access the memory device 6130. By way of example and not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 2, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 6120 may further include the elements shown in FIGS. 1 and 2.

The memory controller 6120 may communicate with an external device, for example, the host 102 of FIG. 1 through the connector 6110. For example, as described with reference to FIG. 1, the memory controller 6120 may be configured to communicate with an external device according to one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 6.

The memory controller 6120 and the memory device 6130 may be integrated into a single semiconductor device. For example, the memory controller 6120 and the memory device 6130 may be so integrated to form a solid state driver (SSD). In another embodiment, the memory controller 6120 and the memory device 6130 may be integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and/or a universal flash storage (UFS).

Figure 12:
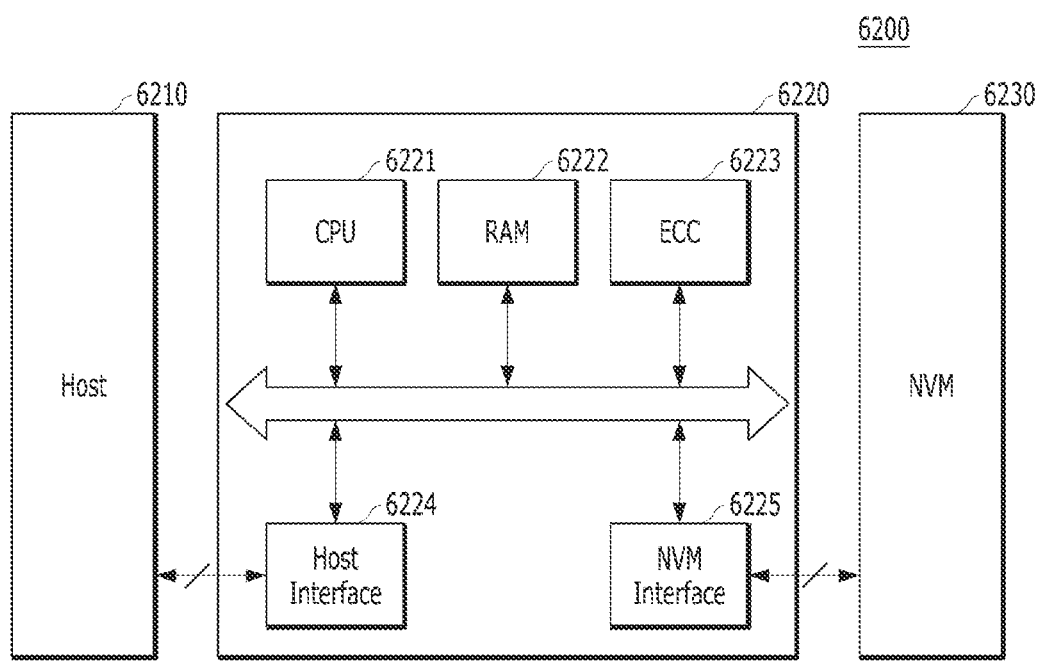
FIG. 12 is a diagram schematically illustrating an example of a data processing system that includes a memory system based on some embodiments of the disclosed technology.

FIG. 12 is a diagram schematically illustrating another example of the data processing system including the memory system in an embodiment.

Referring to FIG. 12, the data processing system 6200 may include a memory device 6230 having one or more nonvolatile memories and a memory controller 6220 for controlling the memory device 6230. The data processing system 6200 illustrated in FIG. 12 may serve as a storage medium such as a memory card (CF, SD, micro-SD or others) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC circuit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and exchange data with the external device. Particularly, as the memory controller 6220 is configured to communicate with the external device through one or more of various communication protocols, the memory system and the data processing system in an embodiment may be applied to wired/wireless electronic devices, particularly a mobile electronic device.

Figure 13:
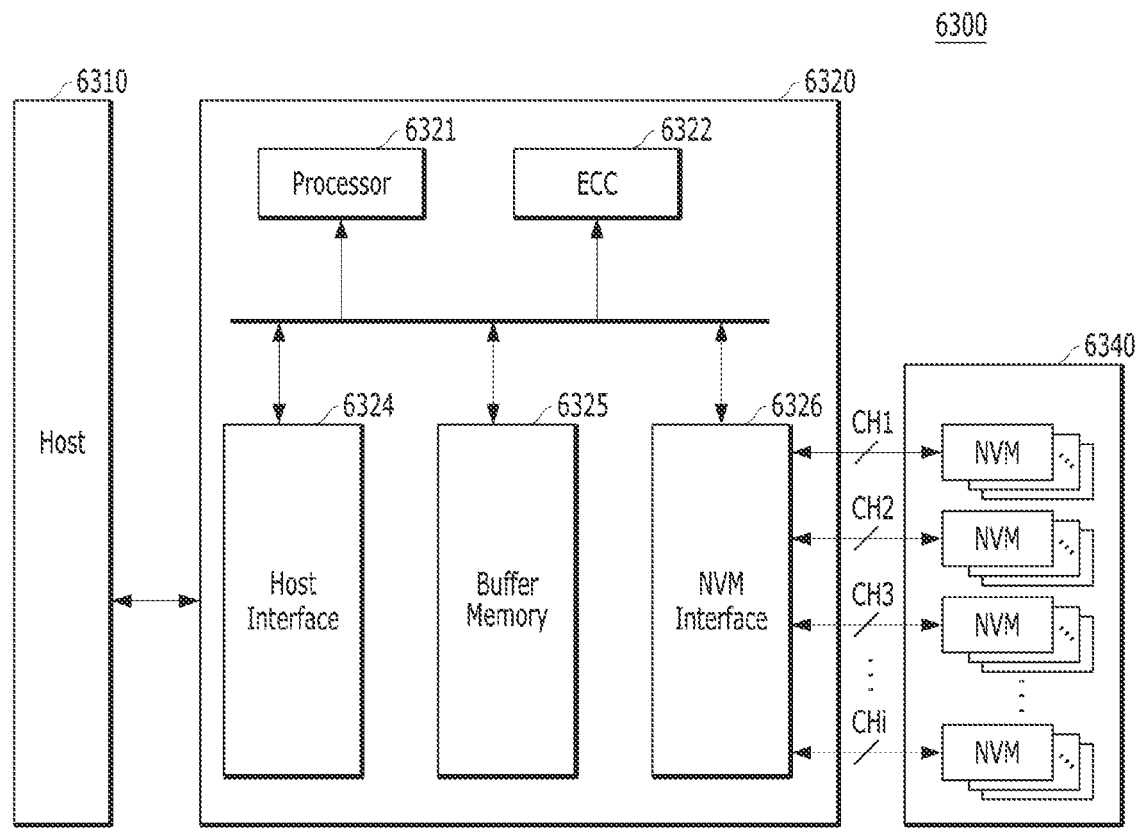
FIG. 13 is a diagram schematically illustrating an example of a data processing system that includes a memory system based on some embodiments of the disclosed technology.

FIG. 13 is a diagram schematically illustrating another example of the data processing system including the memory system in an embodiment. FIG. 13 schematically illustrates an SSD to which the memory system is applied.

Referring to FIG. 13, the SSD 6300 may include a controller 6320 and a memory device 6340 including a plurality of nonvolatile memories. The controller 6320 may correspond to the controller 130 in the memory system 110 of FIGS. 1 and 2. The memory device 6340 may correspond to the memory device 150 in the memory system of FIGS. 1 and 5.

Specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may include any of various volatile memories such as DRAM, SDRAM, DDR SDRAM, LPDDR SDRAM and GRAM or nonvolatile memories such as FRAM, ReRAM, STT-MRAM and PRAM. FIG. 13 illustrates that the buffer memory 6325 is disposed in the controller 6320. However, the buffer memory 6325 may be disposed externally to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 14:
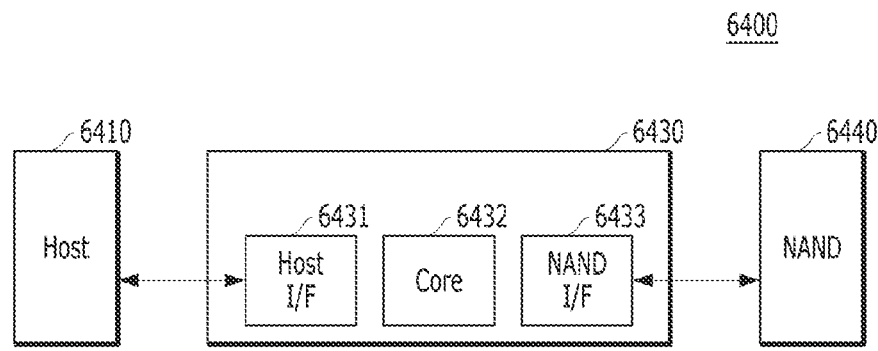
FIG. 14 is a diagram schematically illustrating an example of a data processing system that includes a memory system based on some embodiments of the disclosed technology.

FIG. 14 is a diagram schematically illustrating another example of the data processing system including the memory system in an embodiment. FIG. 14 schematically illustrates an embedded Multi-Media Card (eMMC) to which the memory system is applied.

Referring to FIG. 14, the eMMC 6400 may include a controller 6430 and a memory device 6440, which can include one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6510. The NAND interface 6433 may provide an interface function between the memory device 6440 and the controller 6430. For example, the host interface 6431 may serve as a parallel interface, such as, an MMC interface described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in some embodiments. FIGS. 15 to 18 schematically illustrate UFS (Universal Flash Storage) systems to which the memory system is applied.

Referring to FIGS. 15 to 18, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may include the memory system 110 illustrated in FIGS. 1 and 5. For example, in the UFS systems 6500, 6600, 6700, 6800, the UFS devices 6520, 6620, 6720, 6820 may include the data processing system 6200, the SSD 6300 or the eMMC 6400, and the UFS cards 6530, 6630, 6730, 6830 may include the memory card system 6100 described with reference to FIG. 11.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 15:
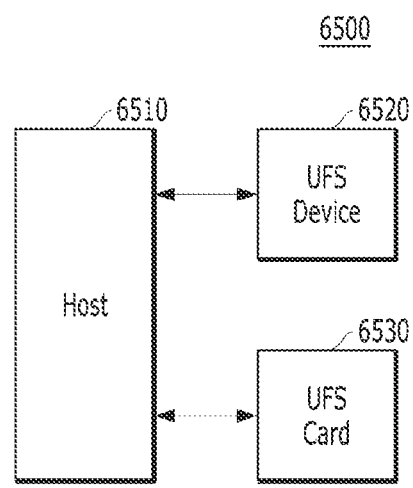
FIG. 15 is diagram schematically illustrating other examples of data processing systems including a memory system based on some embodiments of the disclosed technology.

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In some embodiments, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6510. The form of a star is an arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 16:
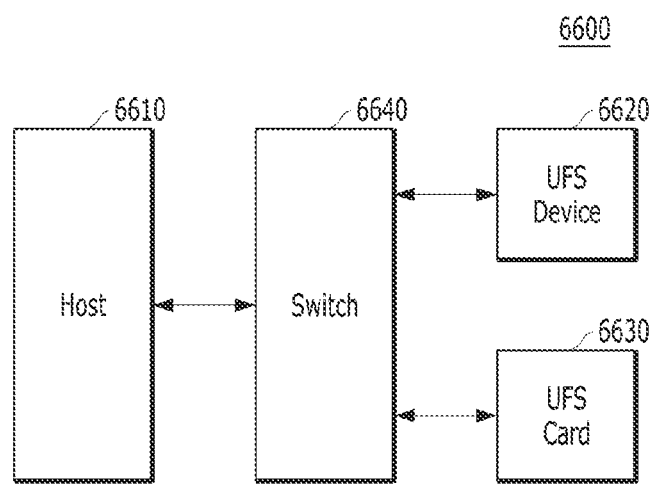
FIG. 16 is diagram schematically illustrating other examples of data processing systems including a memory system based on some embodiments of the disclosed technology.

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In some embodiments, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 17:
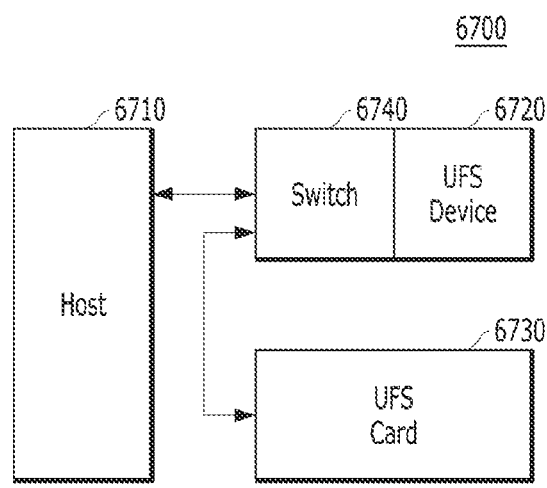
FIG. 17 is diagram schematically illustrating other examples of data processing systems including a memory system based on some embodiments of the disclosed technology.

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In some embodiments, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
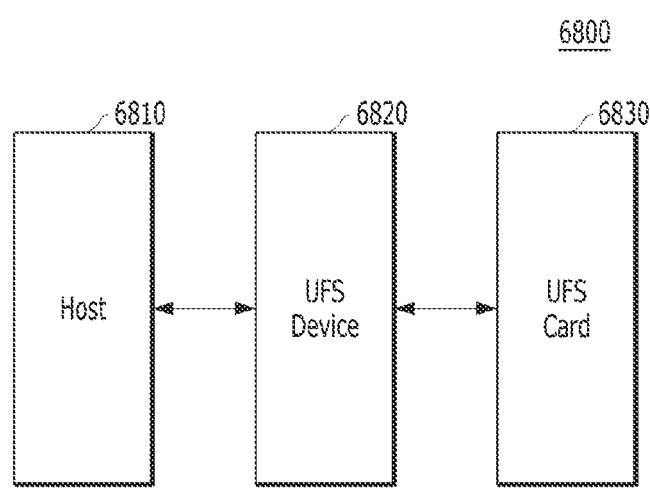
FIG. 18 is diagram schematically illustrating other examples of data processing systems including a memory system based on some embodiments of the disclosed technology.

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In some embodiments, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
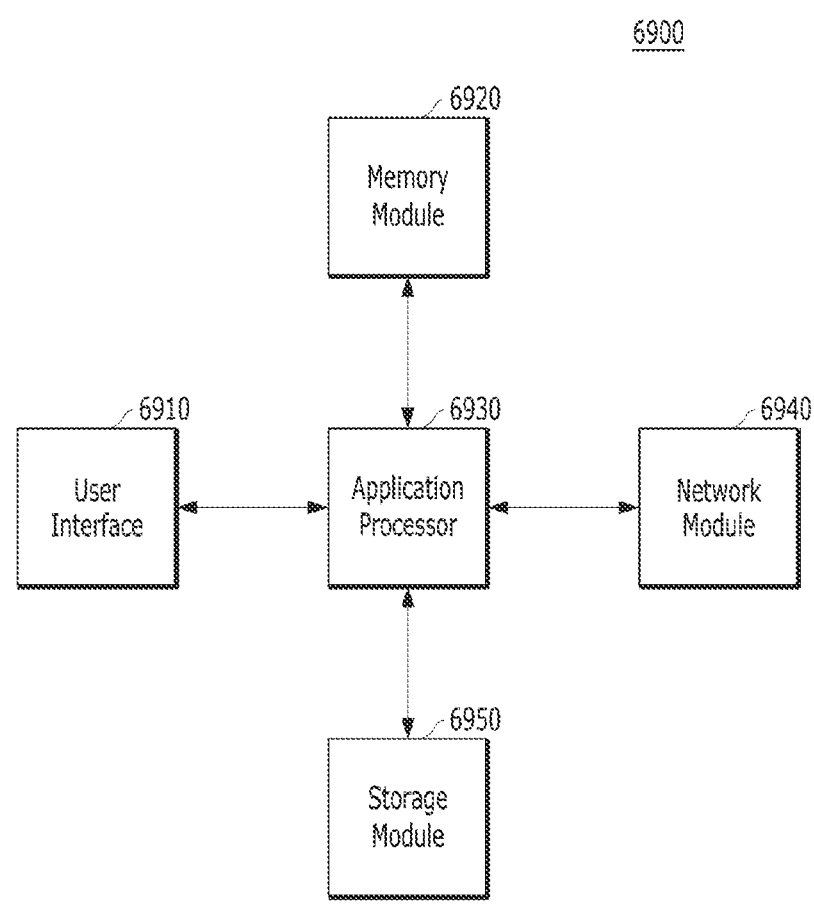
FIG. 19 is a diagram schematically illustrating a user system to which the memory system is applied.

FIG. 19 is a diagram schematically illustrating another example of the data processing system including the memory system in an embodiment of the disclosed technology. FIG. 19 is a diagram schematically illustrating a user system to which the memory system is applied.

Referring to FIG. 19, the user system 6900 may include an application processor 6930, a memory module 6920, a network module 6940, a storage module 6950 and a user interface 6910.

Specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory, or cache memory of the user system 6900. The memory module 6920 may include a volatile RAM such as DRAM, SDRAM, DDR SDRAM, DDR2 SDRAM, DDR3 SDRAM, LPDDR SDARM, LPDDR2 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in an embodiment of the disclosed technology, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may an SSD, an eMMC and an UFS as described above.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the application processor 6930 on a display/touch module of the mobile electronic device. Further, the user interface 6910 may support a function of receiving data from the touch panel.

As described above, in an embodiment of the disclosed technology, a memory system, a data processing system, and a method for verifying an operation method and an operation thereof does not have to track or manage a data pattern, or a write data as a table or a list, which are used for verifying an operation performed in the memory device.

In order to verify an operation of the memory system, since the read data outputted from the memory area through the data reading is compared with estimated read data generated based on arranged write command data, a verification procedure can be performed anytime without a record or a history of programming operation by comparing the read data to the estimated read data generated based on the arranged write command data.

While various embodiments of the disclosed technology have been described, it will be apparent to those skilled in the art that various changes and modifications may be made based on the disclosure of this patent document.

What is claimed is:

1. A memory system comprising:
   a first data storage device and a second data storage device, each of the first and second data storage devices including: a plurality of memory blocks, each memory block including a plurality of memory cells each operable to store one or more data bits; and page buffers that cache data to be written to the memory blocks or read from the plurality of memory blocks on a page basis, wherein the page buffers include a least significant bit page buffer, a center significant bit page buffer, and a most significant bit page buffer; and
   a controller including a cache memory configured to temporarily store first data, and configured to move the first data from a portion of the cache memory to one or more of the page buffers of the first data storage device to allocate the portion of the cache memory as a temporary buffer for storing valid data of background operations.

2. The memory system of claim 1, wherein the controller is configured to:
   read second data corresponding to the valid data of background operations from the first and second data storage devices through one or more remaining page buffers of the first data storage device in which the first data is not stored and through the page buffers of the second data storage device; and
   store the second data in the temporary buffer;
   transfer the second data stored in the temporary buffer to the page buffers of the second data storage device; and
   write the second data into a memory block of the second data storage device.

3. The memory system of claim 2, wherein the controller transfers the first data stored in the one or more of the page buffers of the first data storage device to the temporary buffer, and transfers the first data stored in the temporary buffer to one or more of the page buffers of the second data storage device.

4. The memory system of claim 3, wherein the controller is configured to:
   store, in the temporary buffer, third data read through a page buffer of the second data storage device different from the one or more of the page buffers of the second data storage device and through the page buffers of the first data storage device;
   transfer the third data stored in the temporary buffer to the page buffers of the first data storage device; and
   write the third data into a memory block of the first data storage device.

5. The memory system of claim 4, wherein, upon completion of the writing of the third data, the controller restores the first data, stored in the one or more of the page buffers of the second data storage device, to the cache memory and deallocates the portion of the cache memory as the temporary buffer.

6. The memory system of claim 5, wherein the first data restored to the cache memory is at least one of map data, user data, or system data.

7. The memory system of claim 6, wherein the one or more of the page buffers of the first data storage device and the some of the page buffers of the second data storage device are at least one of most significant bit (MSB), central significant bit (CSB) and least significant bit (LSB) page buffers.

8. The memory system of claim 7, wherein the memory block of the first data storage device and the memory block of the second data storage device are super blocks.

9. The memory system of claim 1, wherein the first data storage device or the second data storage device includes at least one die or at least one plane.

10. An operating method of a memory system having a controller for controlling one or more data storage devices that store data, comprising:
   storing first data in a cache memory of the controller;
   transferring the first data to one or more of page buffers in a first data storage device from a portion of the cache memory, wherein the page buffers include a least significant bit page buffer, a center significant bit page buffer, and a most significant bit page buffer; and
   allocating the portion of the cache memory as a temporary buffer for storing valid data of background operations.

11. The operating method of claim 10, further comprising:
   reading second data corresponding to the valid data of background operations from the first data storage device and a second data storage device through one or more remaining page buffers of the first data storage device in which the first data is not stored and through page buffers of the second data storage device; and
   storing the second data in the temporary buffer;
   transferring the second data stored in the temporary buffer to the page buffers of the second data storage device; and
   writing the second data into a memory block of the second data storage device.

12. The operating method of claim 11, further comprising transferring the first data stored in the one or more of page buffers of the first data storage device to the temporary buffer, and transferring the first data stored in the temporary buffer to one or more of the page buffers of the second data storage device.

13. The operating method of claim 12, further comprising:
   storing, in the temporary buffer, third data read through a page buffer of the second data storage device different from the one or more of the page buffers of the second data storage device and through the page buffers of the first data storage device; and
   transferring the third data stored in the temporary buffer to the page buffers of the first data storage device, and then programming the third data into a block of the first data storage device.

14. The operating method of claim 13, further comprising recovering the first data stored in the some of the page buffers of the second data storage device to the cache memory and deallocating the portion of the cache memory as the temporary buffer upon completion of the writing of the third data into the block of the first data storage device.

15. The operating method of claim 14, wherein the first data restored to the cache memory is at least one of map data, user data, or system data.

16. The operating method of claim 15, wherein the one or more of page buffers of the first data storage device and the some of the page buffers of the second data storage device are at least one of MSB, CSB and LSB page buffers.

17. The operating method of claim 16, wherein the block of the first data storage device and the memory block of the second data storage device are super blocks.

18. The operating method of claim 17, wherein the first data storage device or the second data storage device includes at least one die or at least one plane.

* * * * *